(12) United States Patent
Lu et al.

(10) Patent No.: US 8,995,663 B2
(45) Date of Patent: Mar. 31, 2015

(54) METHOD FOR IMPLEMENTING AN ENCRYPTION ENGINE BY SMART KEY DEVICE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 126 days.

(21) Appl. No.: 13/635,918

(22) PCT Filed: Mar. 29, 2011

(86) PCT No.: PCT/CN2011/072250
§ 371 (c)(1),
(2), (4) Date: Sep. 19, 2012

(87) PCT Pub. No.: WO2011/120421
PCT Pub. Date: Oct. 6, 2011

(65) Prior Publication Data
US 2013/0010955 A1 Jan. 10, 2013

(30) Foreign Application Priority Data

Mar. 31, 2010 (CN) .......................... 2010 1 0138685
Jun. 30, 2010 (CN) .......................... 2010 1 0214432
Aug. 9, 2010 (CN) .......................... 2010 1 0248457

(51) Int. Cl.
*H04L 9/00* (2006.01)
*H04L 9/08* (2006.01)
(Continued)

(52) U.S. Cl.
CPC ............. *H04L 9/0877* (2013.01); *H04L 63/168* (2013.01); *H04L 9/00* (2013.01);
(Continued)

(58) Field of Classification Search
CPC ....... H04L 9/00; H04L 63/168; H04L 63/205; H04L 9/0877; H04L 63/0485; H04L 9/088; H04L 9/3249; H04L 2209/12
USPC .......................................... 380/255; 713/152
See application file for complete search history.

(56) References Cited

U.S. PATENT DOCUMENTS 5,195,136 A 3/1993 Hardy et al.
8,024,563 B1 * 9/2011 Belgaied et al. .............. 713/164
(Continued)

OTHER PUBLICATIONS

Wolfgang Ley, "Cryptographic Framework in OpenSolaris", Proceedings of OpenSolaris Developer Conference 2008.*
(Continued)

*Primary Examiner* — Jung Kim
*Assistant Examiner* — Theodore Parsons
(74) *Attorney, Agent, or Firm* — Hammer & Associates, P.C.

(57) ABSTRACT

Disclosed is a method for implementing an encryption engine, which includes: when an engine binding interface is called, a hardware encryption engine establishes a connection with a hardware encryption equipment, acquires an algorithm list of said equipment, and fills a first data structure; when a key initialization interface is called, said engine, according to the transmitted first data structure, sets an encryption/decryption algorithm to be used by said equipment, and retrieves a corresponding algorithm key; and if no algorithm key is retrieved, said engine controls said equipment to create said algorithm key; when a data encryption/decryption interface is called, said engine, according to the currently set encryption/decryption algorithm and said algorithm key, controls said equipment to perform an encryption/decryption operation on the transmitted data. The present invention can add or extend the encryption/decryption algorithm that can only be implemented in hardware to a software algorithm library.

19 Claims, 12 Drawing Sheets

(51) Int. Cl.
*H04L 9/32* (2006.01)
*H04L 29/06* (2006.01)

(52) U.S. Cl.
CPC .......... *H04L 63/0485* (2013.01); *H04L 63/166* (2013.01); *H04L 63/205* (2013.01); *H04L 2209/12* (2013.01); *H04L 9/088* (2013.01); *H04L 9/3249* (2013.01)
USPC ............................ 380/255; 713/152; 713/191

(56) References Cited

U.S. PATENT DOCUMENTS

| | | | | |
|---|---|---|---|---|
| 2003/0009687 A1* | 1/2003 | Ferchau et al. | ............... | 713/200 |
| 2003/0035547 A1* | 2/2003 | Newton | ................ | 380/279 |
| 2012/0131354 A1* | 5/2012 | French | ................ | 713/189 |

OTHER PUBLICATIONS

Khalil-Hani, M.; Nambiar, V.P.; Marsono, M.N., "Hardware Acceleration of OpenSSL Cryptographic Functions for High-Performance Internet Security," Intelligent Systems, Modelling and Simulation (ISMS), 2010 International Conference, pp. 374-379 (IEEE Jan. 29, 2010).*

Pachenaec, Schuba, and Phalan, New Security Features in OpenSolaris and Beyond, Proceedings of OpenSolaris Developer Conference 2008.*

Hughes, J.; Morton, G.; Pechanec, J.; Schuba, C.; Spracklen, L.; Yenduri, B., "Transparent multi-core cryptographic support on Niagara CMT Processors," Multicore Software Engineering, 2009. IWMSE '09. ICSE Workshop, pp. 81-88 (IEEE May 18, 2009).*

Ning Sun, Chi-Chang Lin, "Using the Cryptographic Accelerators in the Ultraspac T1 and T2 Processors", Sun BluePrints Online (Nov. 2007).*

* cited by examiner

| Mapping relationship | |
|---|---|
| Encryption and decryption algorithm of a hardware encryption device | Encryption and decryption algorithm in OpenSSL |
| ID1 | ID2 |
| Key 1, length =16 bytes | Key 2, length =16 bytes |
| group 1, length =1024 bytes | group 2, length =1024 bytes |
| Initial vector 1, length =16 bytes | Initial vector 2, length =16 bytes |

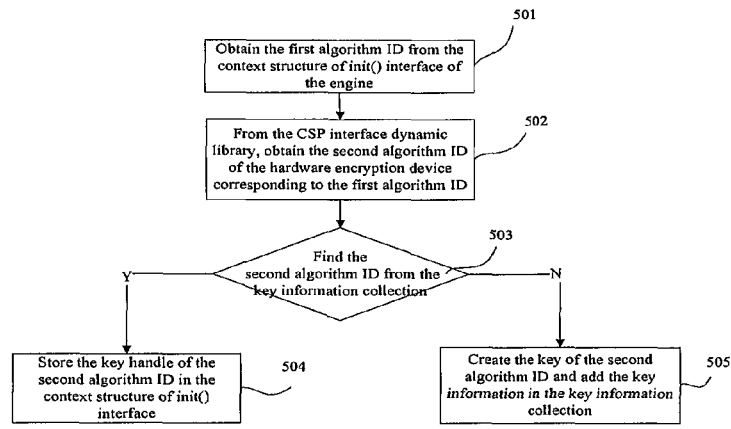
Fig. 9
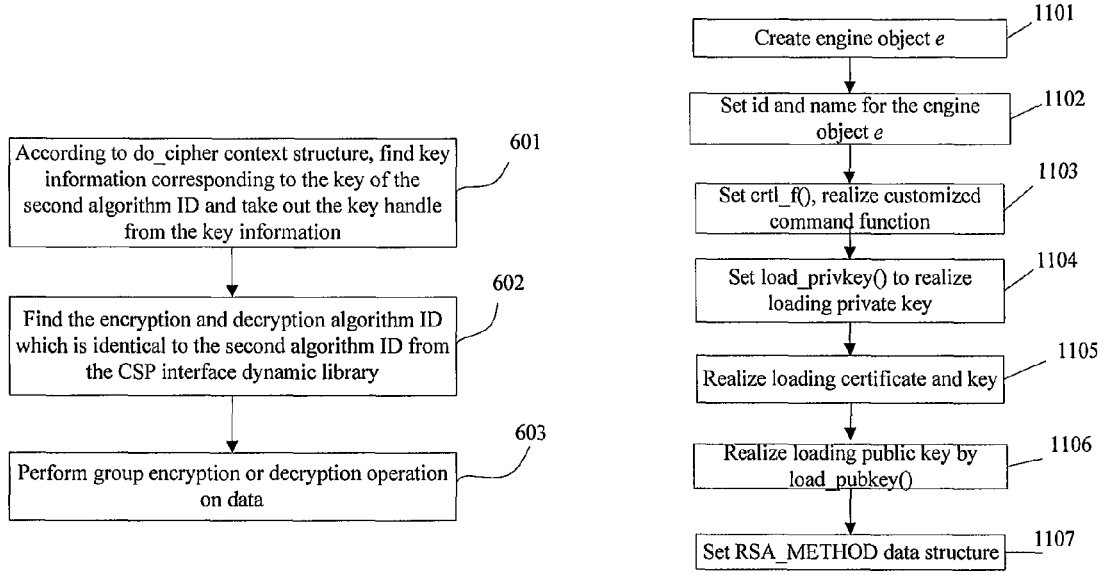
Fig. 10
Fig. 11

METHOD FOR IMPLEMENTING AN ENCRYPTION ENGINE BY SMART KEY DEVICE

FIELD OF THE INVENTION

The present invention relates to information security technology field, and more particularly, relates to a method for implementing an encryption engine, which improves the security for the information computation by expanding and adding the information algorithm to the existed software algorithm library realized by the hardware only.

BACKGROUND OF THE INVENTION

SSL is an abbreviation of Secure Socket Layer, which refers to a secure network communication protocol by combining the public key technology and private key technology. SSL protocol is a secure protocol based on WEB application launched by Netscape Communications Cooperation. SSL protocol specified a layered mechanism provided data security between an application protocol, such as Http, Telenet, NMTP and FTP, etc. and TCP/IP protocol. The SSL protocol provides data encryption, server authentication, information integrity and optional client computer authentication for TCP/IP connection, which mainly is for improving the security of the data between the applications, encrypting and hiding the transferred data and securing the data for not being changed during the data transferring, e.g. securing integrity of the data.

SSL, which combines symmetric cryptography and public-key cryptography, can realize the following three connection objects:

(1) Confidentiality: the data transferred between a SSL client computer and a server is processed by encryption, and the information obtained by the illegal interceptor from the network is cipher text with no meaning.

(2) Integrity: SSL extracts the character value of the transferred information to secure the integrity of the information by using cipher algorithm and Hash function, and ensures that all of the information to be transferred can reach the destination, which prevents the data transferred between the server and the client computer from being destroyed.

(3) Authentic: a client computer and a server can identify each other by using of certificate technology and a trusted third-party authentication. In order to authenticate that the certificate holder is a legal user (not an imposter), and SSL requires that the certificate holders shall exchange digital certificates with each other when they shake hands to secure the legality of the identification of both parties by authentication.

The Public-Key Cryptography Standards (PKCS), developed by RSA Data Security, Inc. in cooperation with its partners, refers to a set of standards for public-key cryptography. PKCS includes a series of associated protocols in aspects of certificate application, certificate update, Certificate Revocation List, extended certificate, digital signature, digital envelope formality, etc. PKCS#11 is called Cryptoki, which defines an independent set of program design interface separated from technology, and is used for the encryption devices such as smart card and a PCMCIA card.

OpenSSL project is a secure project of open source code. Its object is to realize security for the Socket layer (Secure Sockets Layers, SSLv2/v3) and the transport layer (Transport Layer Security, TLS v1). OpenSSL project contains integrated encryption algorithm, digital signature algorithm, and certificate signature algorithm, which secures the integrity, confidentiality, and authentic of the data.

The purpose of the Engine mechanism is to make the OpenSSL to use a software encryption library or a hardware encryption library provided by the third party to perform encryption transparently. The Engine mechanism of OpenSSL achieves this goal successfully, which makes the OpenSSL not only to be an encryption library but also a general encryption interface, which can be coordinated to work with most encryption libraries or an encryption device.

SUMMARY OF THE INVENTION

The object of the present invention is to provide a method for implementing an encrypting engine, which can add the encryption and decryption algorithms which can be realized by hardware only into the software algorithm library, so as to improve the security for the information computation.

Thus, the present invention provides a method for implementing an encrypting engine, in which an upper layer application is implemented by invoking an engine binding interface, an initializing interface, a first interface, or an engine releasing interface, in which the first interface comprises a data encrypting and decrypting interface;

or the first interface comprises an encrypting and decrypting interface, a signature interface, a signature verification interface, and a SSL client side authentication interface in a second data structure;

or the first interface comprises a first digest interface and a second digest interface;

wherein if the first interface comprises the data encrypting and decrypting interface, the initializing interface is a key initializing interface, and the method comprises that when the engine binding interface is invoked by the upper layer application, the engine builds up connection to a smart key device, gets an algorithm list of the smart key device, and fills a first data structure;

when the key initializing interface is invoked by the upper layer application, the engine sets up an encrypting and decrypting algorithm currently to be used by the smart key device according to the first data structure transferred in, and searches for a corresponding algorithm key, and controls the smart key device to create the corresponding algorithm key if the corresponding algorithm key fails to be searched out;

when the data encrypting and decrypting interface is invoked by the upper layer application, the engine controls the smart key device to perform an encryption/decryption operation on the data transferred in according to the currently set encryption and decryption algorithm and the algorithm key, and output an operation result; and when the engine releasing interface is invoked by the upper layer application, the engine ends the connection to the smart key device, or wherein if the first interface comprises an encryption and decryption interface, a signature interface, a signature verification interface, and a SSL client side authentication interface in a second data structure, the initializing interface is an engine initializing interface, and the method comprises that when the engine initializing interface is invoked by the upper layer application, the engine builds up connection to a smart key device;

when the engine binding interface is invoked by the upper layer application, the engine is bonded, an algorithm key and a certificate are loaded, and the second data structure is set up; the algorithm key comprises a public key and a private key;

when the encrypting and decrypting interface in the second data structure is invoked by the upper layer application, the engine controls the smart key device to perform an encrypting/decrypting operation on the data transferred in according to the loaded algorithm key, and output an operation result;

when the signature interface in the second data structure is invoked by the upper layer application, the engine controls the smart key device to perform signature operation on a digest value transferred in according to the loaded algorithm key, and return a signature result;

when the signature verification interface in the second data structure is invoked by the upper layer application, the engine controls the smart key device to perform decryption operation on the signature value transferred in according to the loaded algorithm key, and verify whether the digest value got by decryption operation is correct, if yes, the signature verification is successful, while if no, the signature verification is failed;

when the SSL client side authentication interface in the second data structure is invoked by the upper layer application, the engine controls the smart key device to perform SSL client side authentication according to the loaded certificate, and return an authentication result; and when the engine releasing interface is invoked by the upper layer application, the engine ends the connection to the smart key device, or wherein if the first interface comprises the first digest interface and the second digest interface, the method comprises that when the engine binding interface is invoked by the upper layer application, the engine builds up connection to a smart key device, gets a algorithm list of the smart key device, fills a third data structure, and registers the third data structure to the upper layer application;

when the initializing interface is invoked by the upper layer application, the engine sets up an information digest algorithm used currently by the smart key device according to the third data structure transferred in, allocates storage space for context transferred in, and initializes the context;

when the first digest interface is invoked by the upper layer application, the engine controls the smart key device to perform a digest calculation on the information digest data transferred in according to the currently set information digest algorithm;

when the second digest interface is invoked by the upper layer application, the engine controls the smart key device to end digest calculation and output operation result; and when the engine releasing interface is invoked by the upper layer application, the engine ends the connection with the smart key device.

The present invention has such merits that by mean of the encrypting engine, some hardware encryption and decryption algorithms, which are especially never disclosed before and used to be realized by hardware only, can be added into and extended to the software algorithm library; and by mean of the encrypting engine, some hardware information digest algorithms, which are especially never disclosed before and used to be realized by hardware only, can be added into and extended to the software algorithm library so as to improve the security for the information digest computation.

BRIEF DESCRIPTION OF THE DRAWINGS

FIG. 9 is a flow chart for obtaining an encryption and decryption algorithm of a CSP interface dynamic library;

FIG. 10 is a flow chart for sub-package encryption and decryption;

FIG. 11 is a flow chart for invoking the engine binding interface bind_engine provided by the embodiment of the present invention;

DETAILED DESCRIPTION OF THE INVENTION

The following is detailed description for preferred embodiments in conjunction with the accompanying drawings. It should be noted that the description is for example only but not for the limitation of the scope of the invention and its application.

Embodiment 1

Figures 1, 2:
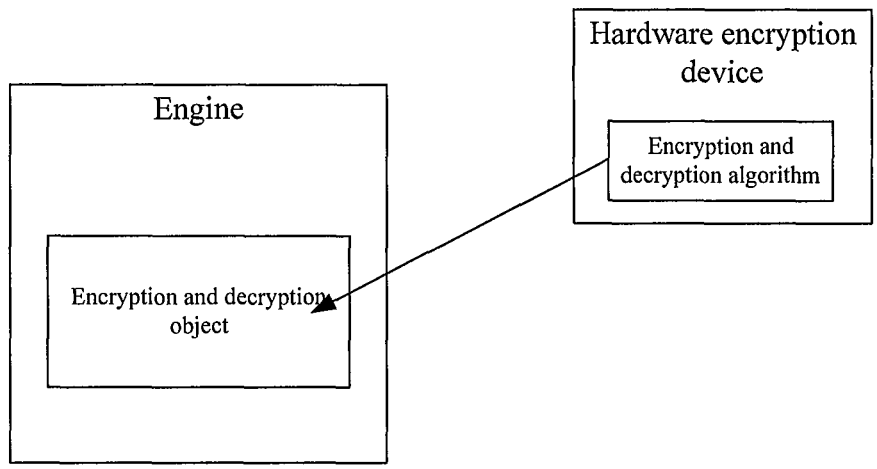
FIG. 1 shows a schematic diagram for mapping relation between an encryption and decryption algorithm of a hardware device and an encryption and decryption algorithm of the OpenSSL library.
FIG. 2 shows a schematic diagram for that encryption and decryption algorithm of a hardware device is transferred into the engine to obtain the encryption and decryption algorithm of an engine.

Before an engine is invoked, a mapping relation between an encryption and decryption algorithm of a hardware device and an encryption and decryption algorithm in the OpenSSL interface has been built in the engine. FIG. 1 shows a schematic diagram for the mapping relation between the encryption and decryption algorithm of the hardware device and the encryption and decryption algorithm in the OpenSSL database. In FIG. 1, specifically, the mapping relation between the encryption and decryption algorithm of the hardware device and the encryption and decryption algorithm in the OpenSSL database is that the encryption and decryption algorithms in the hardware encryption device and the encryption and decryption algorithms in the OpenSSL interface which have identical algorithm references are regarded as the encryption and decryption algorithms with the mapping relation. The algorithm references comprise key length, packet length, and initial vector length.

FIG. 2 shows a schematic diagram for that encryption and decryption algorithm of a hardware device is transferred into the engine to obtain the encryption and decryption algorithm of the engine. In FIG. 2, an encrypted object can be created in the engine in order to store information which relates to the encryption and decryption algorithm. After the engine is invoked and loaded, the encryption and decryption algorithm in the hardware encryption device will be transferred in the symmetrical encryption object in the engine, so as to transfer the encryption and decryption algorithm of the hardware encryption device into the engine to obtain the encryption and decryption algorithm of the engine.

Figure 3:
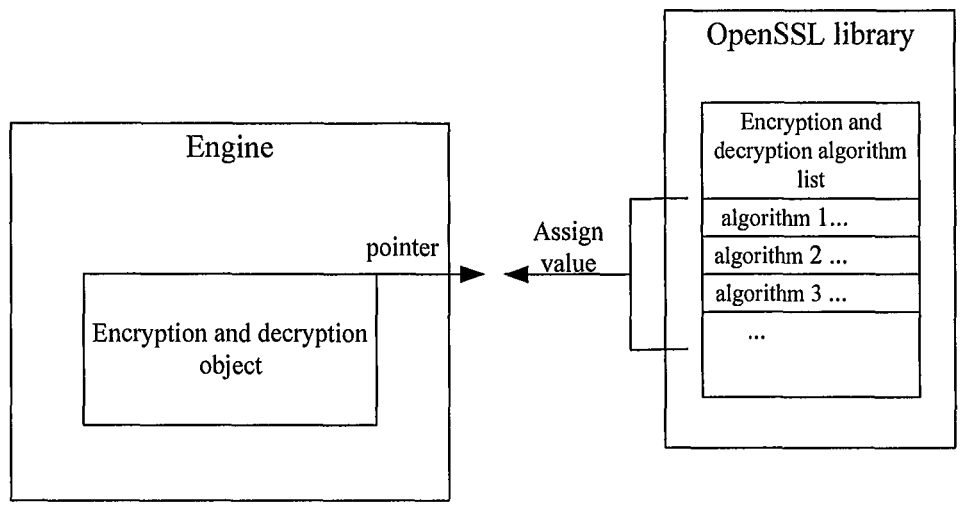
FIG. 3 shows a schematic diagram for that encryption and decryption algorithm list values of the OpenSSL interface assign value to the pointer of the encryption and decryption algorithm of an engine.

And then, obtaining the pointer of the encryption and decryption algorithm of the engine, the encryption and decryption algorithm list value in the OpenSSL interface, and respective IDs of the encryption and decryption algorithms. Determining whether the pointer of the encryption and decryption algorithm of the engine is null, if yes, it shows that pointer of the encryption and decryption algorithm of the hardware encryption device which is transferred into the engine is null, and then assigning a value to the pointer of the encryption and decryption algorithm of the engine by using the encryption and decryption list value in the OpenSSL interface and returning the encryption and decryption list value in the OpenSSL interface back. FIG. 3 shows a schematic diagram for that encryption and decryption algorithm list value of the OpenSSL interface assign value to the pointer of the encryption and decryption algorithm of the engine. In FIG. 3, when the pointer of the encryption and decryption algorithm of the engine is null, it shows that no encryption and decryption algorithm is in the hardware encryption device since the encryption and decryption algorithm stores the encryption and decryption algorithm of the hardware encryption device. At that time, the encryption and decryption algorithm list value in the OpenSSL interface assigns a value to the pointer of the encryption and decryption algorithm of the engine. When the encryption and decryption algorithm of the engine is invoked, the engine will invoke the encryption and decryption algorithom in the OpenSSL interface according to the pointer assigned with the value.

Figure 4:
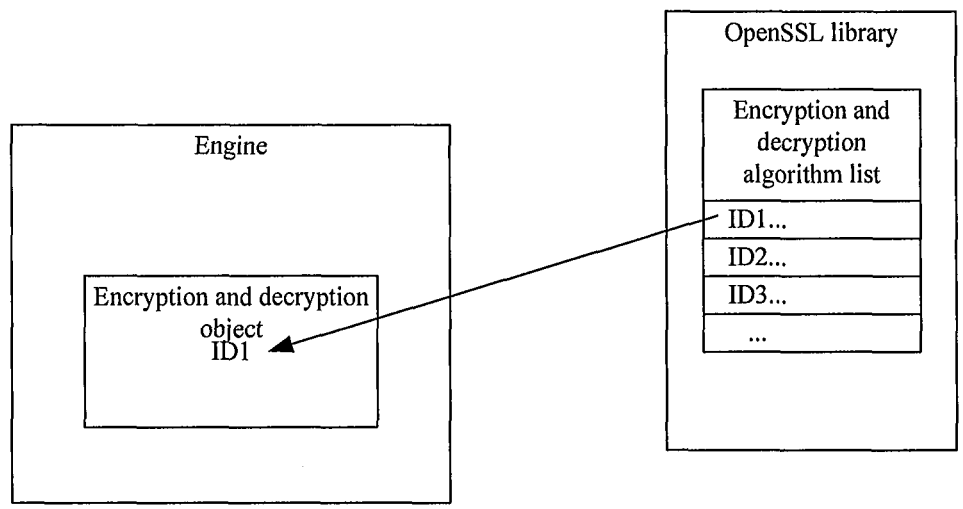
FIG. 4 shows a schematic diagram for returning encryption and decryption algorithm in the OpenSSL library corresponding to the encryption and decryption algorithm of the hardware device.

If the pointer of the encryption and decryption algorithm of the engine is not null, the encryption and decryption algorithm in the OpenSSL interface corresponding to the encryption and decryption algorithm of the hardware encryption device is returned according to the mapping relation between the encryption and decryption algorithm of the hardware encryption device and the encryption and decryption algorithm of the OpenSSL interface and algorithm IDs. FIG. 4 shows a schematic diagram for returning the encryption and decryption algorithm in the OpenSSL interface corresponding to the encryption and decryption algorithm of the hardware encryption device. In FIG. 4, if the pointer of the encryption and decryption algorithm of the engine is not null, it shows that the hardware encryption device contains an encryption and decryption algorithm. At that time, according to the mapping relation between the encryption and decryption algorithm of the hardware encryption device and the encryption and decryption algorithm in the OpenSSL interface and algorithm IDs, the encryption and decryption algorithm in the OpenSSL interface corresponding to the encryption and decryption algorithm of the hardware encryption device is found and returned. That is, the encryption and decryption algorithm in the OpenSSL interface is stored in the symmetrical encryption object of the engine. In this way, what is stored in the symmetrical encryption object of the engine is the encryption and decryption algorithm in the OpenSSL interface having the mapping relation with the encryption and decryption algorithm of the hardware encryption device.

Embodiment 2

An engine is reserved by OpenSSL and is for loading the encryption library of a third party, which mainly includes code loaded by a dynamic library and a series of interfaces managed by the encryption function pointer. In order to use the engine, OpenSSL will load the engine at first, and select an algorithm to be used or all of the encryption and decryption algorithm which are supported. And thus, when an application invokes an encryption and decryption function, the application will point to a loaded encryption and decryption algorithm in the encryption library of the third party, and not the encryption and decryption algorithm in the libeay32.dll library of OpenSSL. The principle of the engine is to replace the default encryption and decryption function in the OpenSSL with the function pointer of the encryption library of the third party or the interface pointer of the hardware encryption device, so as to realize loading the encryption library of the third party dynamically.

In the embodiment 2, a hardware encryption engine is connected with the hardware encryption device via hardware encryption interface PKCS#11 (password token) interface dynamic library (of course, or the hardware encryption interface CSP interface dynamic library) to complete data encryption and decryption operation. The PKCS#11 interface dynamic library is provided by the developer of the hardware encryption device. The hardware encryption device comprises a smart key device (such as USB KEY), an encryption equipment at a server side, etc. The detail in the PKCS#11 interface dynamic library is not in the scope described by the present invention.

The hardware encryption engine of the present invention is realized by four functions, such as bind_engine( ), init_( ), do_cipher( ) and clean_up( ), registered in the OpneSSL interface. Thereby, the bind_engine( ) as the engine binding interface is for binding the engine; the init( ) as the key initializing interface is for obtaining the encryption and decryption algorithm in the hardware encryption interface dynamic library and initializing the key and key information; the do_cipher( ) as the data encryption and decryption interface is for packet encryption or decryption on data; and the clean_up( ) as the engine releasing interface is for releasing the engine.

The implementing progress of the hardware encryption engine (hereafter as engine briefly) in the present invention is illustrated by taking the example of programming with standard C language and combining PKCS#11 interface dynamic library and OpenSSL interface.

Figure 5:
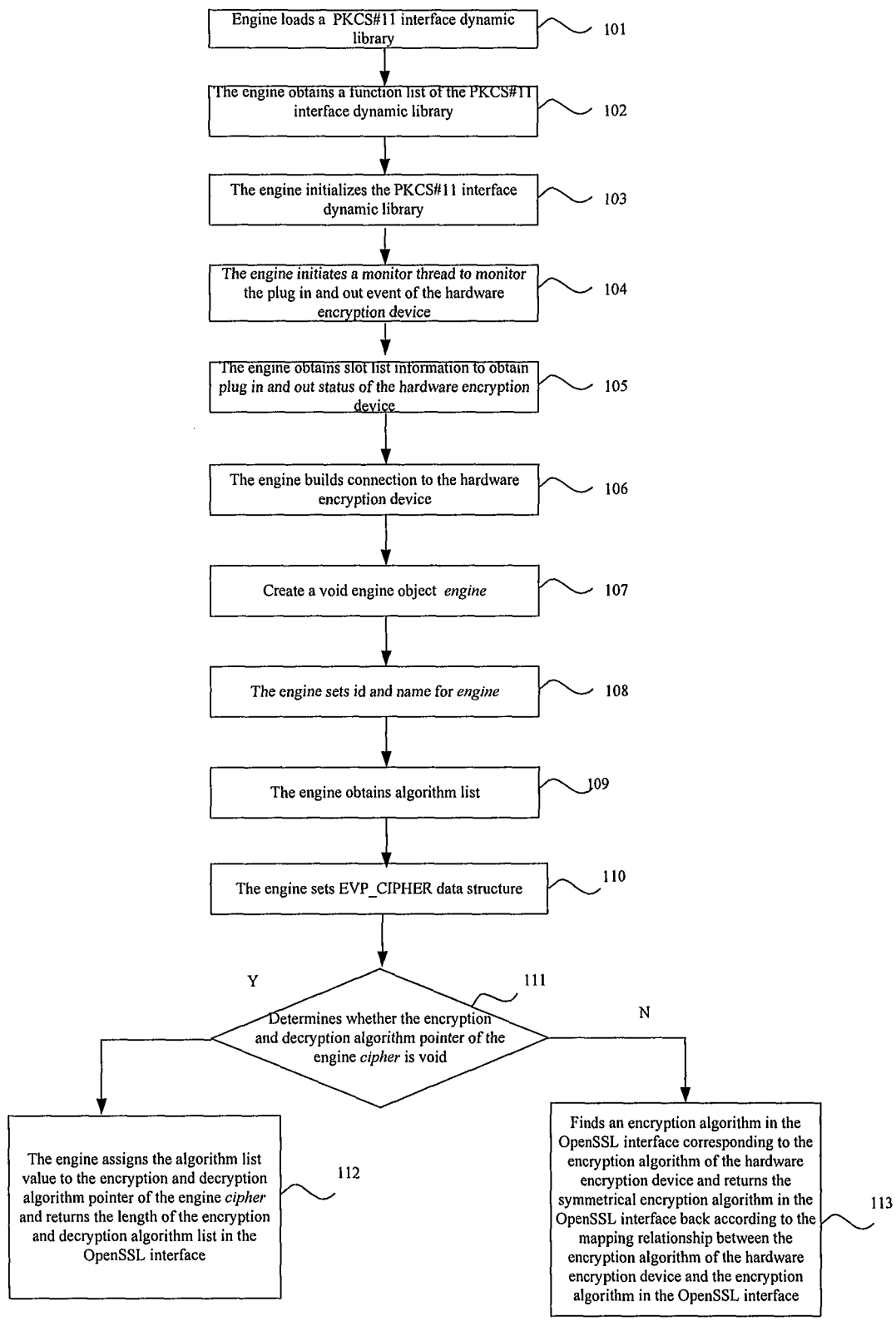
FIG. 5 shows a flow chart for binding an engine.

Referring to FIG. 5, when the bind_engine( ) interface is invoked by the OpenSSL interface of the upper layer application, the hardware encryption engine performs the following operation:

Step 101, the engine loads PKCS#11 interface dynamic library.

Preferably, the step is completed by invoking a system function loadlibrary( ) of a computer. The file name of the PKCS#11 interface dynamic library is predetermined.

Step 102, the engine obtains a function list of the PKCS#11 interface dynamic library.

Preferably, the step is completed by invoking function C_GetFunctionList( ) in the PKCS#11 interface;

Furthermore, the step can firstly invoke computer system function GetProcAddress( ) to attempt to get an entry point of the function C_GetFunctionList( ) at the PKCS#11 interface. If the function C_GetFunctionList( ) is invoked successfully, other entry points at the PKCS#11 interface can be got and the PKCS#11 interface dynamic library function list can be got by invoking those interfaces, if the attempt is failed, an error is prompted, and the process returns back.

Specifically, the function list of PKCS#11 interface dynamic library can be CK_FUNCTION_LIST_PTR.

It should be noted that the function list of the PKCS#11 interface dynamic library contains the pointer of the function pointer in the PKCS#11 interface dynamic library.

Step 103, the engine initializes the PKCS#11 interface dynamic library by invoking the function C_Initialize( ) defined in the PKCS#11 interface dynamic library.

Specifically, invoking the function C_Initialize( ) defined in the PKCS#11 interface dynamic library is realized by obtaining the pointer of the function C_Initialize( ) pointer in the function list of the PKCS#11 interface dynamic library.

It should be noted that invoking the C_Initialize( ) interface is prior to other operations according to PKCS#11 interface standard.

Step 104, the engine creates and initiates a monitor thread, for monitoring the plug-in&out event of the hardware encryption device, and stores the plug-in&out status of the hardware encryption device in customized data structure.

Preferably, monitoring the plug-in&out event (plug-in&out of the hardware encryption device) of the hardware encryption device is realized by invoking a function C_WaitForSlotEvent( ) defined in the PKCS#11 interface dynamic library, and the customized data structure is updated on time according to the monitored plug-in&out status.

Thereby, invoking the function C_WaitForSlotEvent( ) defined in the PKCS#11 interface dynamic library is realized by obtaining the pointer of the function C_WaitForSlotEvent( ) pointer in the function list of the PKCS#11 interface dynamic library of step 102.

Specifically, the customized data structure refers to a collection of slot list information; thereby, the slot list information contains the information about the plug-in&out status of the hardware encryption device.

Specifically, the slot list information data structure defined in the PKCS#11 interface dynamic library contains information such as a slot description, a manufacture ID, a performance identifier, a hardware sequence number, and a firmware sequence number, etc.

Step 105, the engine obtains the slot list information to get the plug-in &out status of the hardware encryption device.

Preferably, the engine obtains the slot list information by invoking an function C_GetSlotList( ) defined in the PKCS#11 interface dynamic library to get the plug-in&out status of the hardware encryption device and get the handle of the hardware encryption device which connects with a host computer currently. If a plurality of hardware encryption devices are connected to the host computer, the first hardware encryption device of the list is selected.

Specifically, invoking the function C_GetSlotList( ) defined in the PKCS#11 dynamic library is invoked by the pointer of the function C_GetSlotList( ) pointer in the function list of the PKCS#11 interface dynamic library obtained by the step 102.

Step 106, the engine builds up connection with the hardware encryption device, so as to perform operation on the hardware encryption device.

Preferably, the engine builds up connection with the hardware encryption device by invoking an function C_OpenSession( ) defined in the PKCS#11 interface dynamic library.

Specifically, invoking the function C_OpenSession( ) defined in the PKCS#11 interface dynamic library is realized by invoking the pointer of the function C_OpenSession( ) pointer in the function list of the PKCS#11 interface dynamic library obtained in Step 102.

It should be noted that, in Step 105, obtaining the plug-in&out status of the hardware encryption device in the slot list information is for notifying the current status of the hardware encryption device to the engine. If the hardware encryption device is removed out, the engine closes session with the hardware encryption device on time; if the hardware encryption device is plugged in, the engine initiates session with the hardware encryption device on time, so as to improve working efficiency. Meanwhile, an error caused by the situation that the engine initiates a temporary session with the hardware device when the hardware device is in plug-out status is avoided.

Step 107, the engine creates a null engine object engine by an function ENGINE_new( ). Thereby, the function ENGINE_new( ) has been defined in the OpenSSL interface.

Step 108, the engine sets up an id and a name for the engine object engine. For example, ENGINE_set_id(engine, "rt18651b"), ENGINE_set_name(engine, "BSD rt18651b engine").

Step 109, the engine obtains the algorithm list of the hardware encryption device;

Specifically, the algorithm list is obtained by invoking the C_GetMechanismList in the PKCS#11 interface;

For example, the obtained algorithm list is as the following:

```
CKM_SHA_1, {0, 0, CKF_DIGEST}},
    {CKM_DES_ECB, { 8, 8,
CKF_ENCRYPT|CKF_DECRYPT|CKF_WRAP|CKF_UNWRAP}},
    {CKM_DES_CBC, { 8, 8,
CKF_ENCRYPT|CKF_DECRYPT|CKF_WRAP|CKF_UNWRAP}},
    {CKM_DES3_ECB, { 24, 24,
CKF_ENCRYPT|CKF_DECRYPT|CKF_WRAP|CKF_UNWRAP}},
    {CKM_DES3_CBC, { 24, 24,
CKF_ENCRYPT|CKF_DECRYPT|CKF_WRAP|CKF_UNWRAP}},
```

Step 110, the engine sets up EVP_CIPHER data structure of the encryption and decryption object for the upper layer OpenSSL application to invoke.

Thereby, the definition of the EVP_CIPHER data structure is existed in the OpenSSL already, specifically, which is shown as following:

```
struct evp_cipher_st
{
int nid;
int block_size;
int key_len; /* Default value for variable length ciphers */
int iv_len;
unsigned long flags; /* Various flags */
int (*init)(EVP_CIPHER_CTX *ctx, const unsigned char *key,
     const unsigned char *iv, int enc); /* init key */
int (*do_cipher)(EVP_CIPHER_CTX *ctx, unsigned char *out,
     const unsigned char *in, unsigned int inl);/* encrypt/decrypt data */
int (*clean_up)(EVP_CIPHER_CTX *); /* clean_up ctx */
int ctx_size; /* how big ctx->cipher_data needs to be */
int (*set_asn1_parameters)(EVP_CIPHER_CTX *, ASN1_TYPE *); /* Populate a
ASN1_TYPE with parameters */
     int (*get_asn1_parameters)(EVP_CIPHER_CTX *, ASN1_TYPE *); /* Get parameters
from a ASN1_TYPE*/
     int (*ctrl)(EVP_CIPHER_CTX *, int type, int arg, void *ptr); /* Miscellaneous
operations */
     void *app_data; /* Application data */
     } /* EVP_CIPHER */;
     typedef struct evp_cipher_st EVP_CIPHER;
     nid: algorithm ID number which is defined in include/openssl/object.h;
     block_size: encryption and decryption block size
     key_len: key length
     iv_len: initial vector length
     flags:flag
     (* init) : initializing function, providing key, IV vector, algorithm context CTX, encryption
or decryption
     (* do_cipher): encryption or decryption function, providing the algorithm context CTX,
output data, input data, and length of the input data
     (* clean_up) : resource releasing
     ctx_size: size of data relates to respective algorithms, actually is key data of respective
algorithms
     (*set_asn1_parameters): setting up asn 1 parameters
     (*get_asn1_parameters) : obtainning asnl parameters
     (*ctrl): other control operation
     app_data: data related to algorithm
```

Thereby, the engine sets up the EVP_CIPHER data structure is specifically by ENGINE_set_ciphers( ) function and sets up the corresponding nid according to OpenSSL definition.

Thereby, the definition of the ENGINE_set_ciphers is as the following:

int ENGINE_set_ciphers(ENGINE*e, ENGINE_CIPHERS_PTR f).

e: engine object pointer f: callback function selected by the symmetrical algorithm in the engine The definition of the callback function f is as the following:

```
typedef int (*ENGINE_CIPHERS_PTR)(ENGINE *e, const
     EVP_CIPHER **cipher,
const int **nids, int nid)
     e: engine object pointer
     cipher: pointer of EVP_CIPHER pointer
     nids refers to a symmetrical algorithm list value (e.g. int array)
     nid is algorithm ID number which is transferred in at the time of
        obtaining the engine
object.
```

Specifically, the engine fills EVP-CIPHER data structure according to the obtained algorithm list;

For example, in the algorithm list,

```
{CKM_DES3_CBC, { 24, 24,
CKF_ENCRYPT|CKF_DECRYPT|CKF_WRAP|CKF_UNWRAP}}
``` represents that the smart key device supports 3DES encryption and decryption operation of CBC(cipher block chaining) mode; either the block size or the key length is 24 bytes. The corresponding EVP_CIPHER data structure is as the following:

```
{
20,
24,
24,
24,
0
&Encrypt_DES3_CBC_Init,
&Encrypt_Update,
&Encrypt_Final,
sizeof(EVP_CIPHER_CTX),
NULL,
NULL,
NULL,
}
```

Thereby, Encrypt_DES3_CBC_Init, Encrypt_Updata and Encrypt_Filnal are the interfaces inside the engine, which complete encryption operation by PKCS#11 interface.

Step 111, the engine determines whether the encryption and decryption algorithm pointer cipher transmitted in from the bind_engine( ) interface is null, if yes, go to Step 112; otherwise, go to Step 113.

Specifically, according to the encryption and decryption algorithm transferred in the hardware encryption device from the bind_engine( ) interface, EVP_CIPHER obtains the encryption and decryption algorithm of the hardware encryption device which becomes the encryption and decryption algorithm of the engine;

Step 112, the engine assigns the encryption and decryption algorithm list value in the OpenSSL interface to the encryption and decryption algorithm pointer of the engine cipher and returns the length of the encryption and decryption algorithm list in the OpenSSL interface.

Where, the length of the encryption and decryption algorithm list refers to the number of encryption and decryption algorithms.

When the pointer of the encryption and decryption algorithm of the engine is null, there is no encryption and decryption algorithm in the hardware encryption device because what the encryption and decryption algorithm of the engine is stored is the encryption and decryption algorithm of the hardware encryption device. At that time, the encryption and decryption algorithm list value in OpenSSL interface assigns a value to the pointer of the encryption and decryption algorithm of the engine. When the encryption and decryption algorithm of the engine is invoked, the engine invokes the encryption and decryption algorithm in the OpenSSL interface according to the pointer with assigned value.

Step 113, according to the mapping relation between the encryption and decryption algorithm of the hardware encryption device and the encryption and decryption algorithm in the OpenSSL interface and algorithm ID, the encryption and decryption algorithm in the OpenSSL interface which is corresponding to the encryption and decryption algorithm of the hardware encryption device is found and returned.

When the pointer of the encryption and decryption algorithm of the engine is not null, it shows that the hardware encryption device contains an encryption and decryption algorithm. At that time, find the encryption and decryption algorithm in the OpenSSL interface which is corresponding to the encryption and decryption algorithm of the hardware encryption device and return the encryption and decryption algorithm in the OpenSSL interface, e.g. store the encryption and decryption algorithm in the OpenSSL interface in the symmetrical encryption object of the engine. In this way, what is stored in the symmetrical encryption object of the engine is the encryption and decryption algorithm in the OpenSSL interface which has the mapping relation with the encryption and decryption algorithm of the hardware encryption device.

OpenSSL interface further executes the following operation after the completion of invoking the bind_engine( ) function and before the init( ) is invoked: the OpenSSL interface initializes the engine by invoking the function ENGINE_init( ); OpenSSL interface sets the encryption and decryption algorithm provided by the engine to be the default encryption and decryption algorithm of the engine by invoking function ENGINE_set_default_ciphers( ); OpenSSL interface obtains the EVP_CIPHER object and the algorithm ID from the engine and invokes function EVP_EncryptInit/EVP_DecryptInit( ) and transfers function init( ) in.

Firstly, it should know that when the init( ) interface is invoked by the upper layer OpenSSL application, the parameters transferred in the init( ) interface include:

```
int (*init)(EVP_CIPHER_CTX *ctx,// context
const unsigned char *key, // symmetrical key value
const unsined char *iv, // initial vector
int enc);
```

Thereby, the context structure EVP_CIPHER_CTX in the function init( ) is as the following:

```
struct evp_cipher_ctx_st
{
const EVP_CIPHER *cipher;
ENGINE *engine; /* functional reference if 'cipher' is ENGINE-
```

-continued

```
provided */
int encrypt; /* encrypt or decrypt */
int buf_len; /* number we have left */
unsigned char oiv[EVP_MAX_IV_LENGTH]; /* original iv */
unsigned char iv[EVP_MAX_IV_LENGTH]; /* working iv */
unsigned char buf[EVP_MAX_BLOCK_LENGTH];/* saved partial
block */
int num; /* used by cfb/ofb mode */
void *app_data; /* application stuff*/
int key_len; /* May change for variable length cipher */
unsigned long flags; /* Various flags */
void *cipher_data; /* per EVP data */
int final_used;
int block_mask;
unsigned char final[EVP_MAX_BLOCK_LENGTH];/* possible
final block */
} /* EVP_CIPHER_CTX */;
typedef struct evp_cipher_ctx_st EVP_CIPHER_CTX;
Parameters include:
cipher : algorithm pointer
engine : encryption and decryption engine
encrypt : encryption or decryption
buf_len : free space
oiv : original initial vector
iv : current initial vector
buf : saved part block data
num : data number in cfb/ofb mode
app_data : data related application
key_len : key length
flags : flag
cipher_data : part related to the respective algorithms, mainly the
keys of respective
algorithms etc.
    final_used :
    block_mask : mask of block
    final : final block of packet
```

Figure 6:
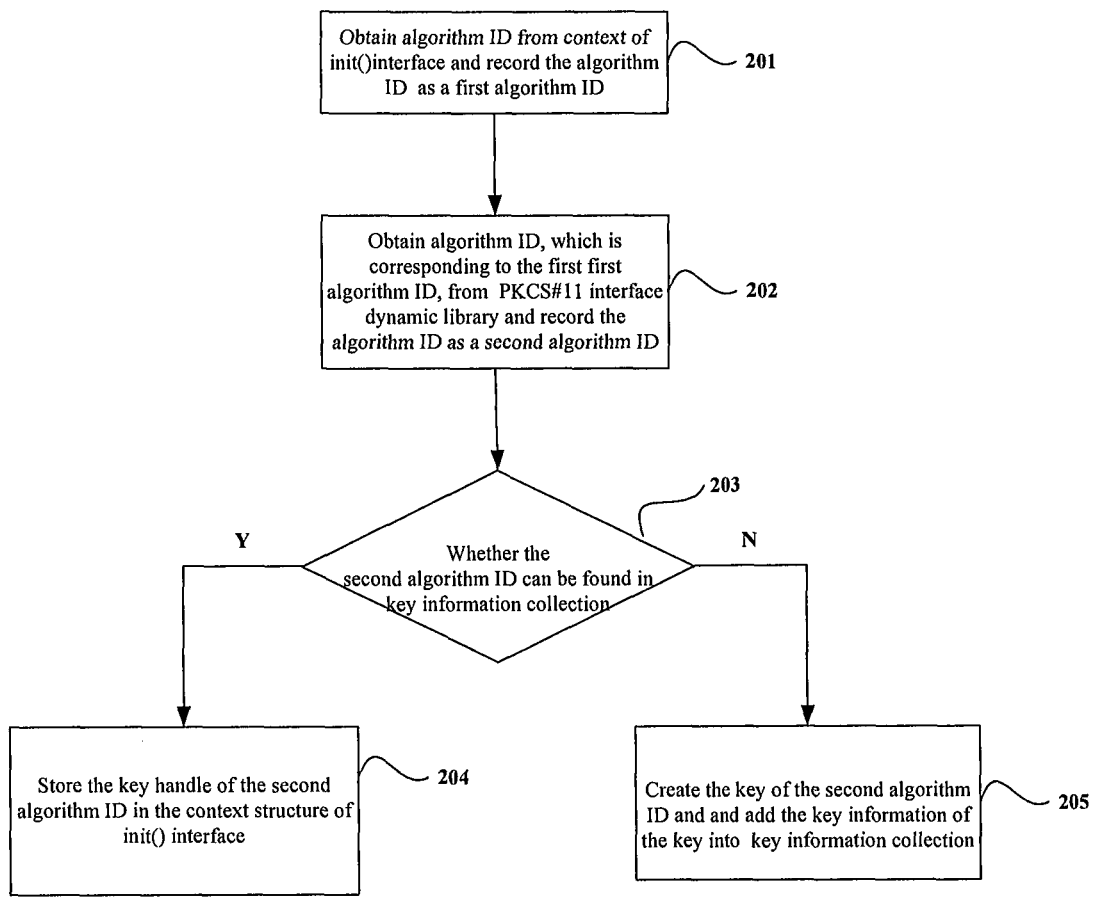
FIG. 6 shows a flow chart for obtaining the encryption and decryption algorithm in the PKCS#11 interface dynamic library.

As shown in FIG. 6, when the init( ) interface is invoked by the upper layer OpenSSL application, the hardware encryption engine (briefly as engine hereafter) performs the following operation:

Step 201, obtain the ID of the encryption and decryption algorithm in the OpenSSL interface corresponding to the encryption and decryption algorithm in the hardware encryption device from the context structure EVP_CIPHER_CTX of the function init( ) and record the ID as the first algorithm ID.

Specifically, obtain the first algorithm ID by the variable ctx->cipher->nid of the context structure EVP_CIPHER_CTX.

Thereby, the variable ctx->cipher->nid of the context structure is provided by the cipher object obtained by the engine.

Step 202, obtain the encryption and decryption algorithm ID of the hardware encryption device corresponding to the first algorithm ID from the PKCS#11 interface dynamic library according to the mapping relation between the encryption and decryption algorithm of the hardware encryption device and the encryption and decryption algorithm in the OpenSSL interface and record the encryption and decryption algorithm ID of the hardware encryption device as the second algorithm ID, and store the second algorithm ID in the engine; in this way, the engine sets the encryption and decryption algorithm currently used by the hardware encryption device to be the encryption and decryption algorithm corresponding to the second algorithm ID.

Specifically, the second algorithm ID is stored in the cipher_data(ctx->cipher_data) field in the context structure of the init( ) function.

Thereby, in the engine, one-to-one corresponding mapping relation for the encryption and decryption algorithms with identical parameters between the hardware encryption device and the OpenSSL is built up. The algorithms with identical parameters specifically refers to that the parameters such as the key length, the block size and the initial vector length are identical.

For the convenience of understanding, the embodiment 2 gives details of process of obtaining the second algorithm ID according to the mapping relation between the encryption and decryption algorithm in the hardware encryption device and the encryption and decryption algorithm in the OpenSSL interface. If the algorithm in the OpenSSL interface is AES, the algorithm in the PKCS#11 interface dynamic library is SSF33; the mapping relation between the two algorithms has been defined in the engine object already, and the algorithm parameters of AES algorithm and SSF33 algorithm are identical. AES algorithm ID can be obtained in the variable ctx->cipher->nid of the context structure of AES algorithm. If AES algorithm ID is obtained, find SSF33 algorithm according to the mapping relation, so as to get the algorithm ID of SSF33, that is, the second algorithm ID.

Step 203, search for the second algorithm ID in the key information collection and determine whether the second algorithm ID can be found, if yes, go to Step 204; otherwise, go to Step 205.

Specifically, determining whether the key information of the second algorithm ID can be found in the key information collection includes invoking function EVP_EncryptInit/EVP_DecryptInit( ) in the OpenSSL interface, and searching for the second algorithm ID in the key information collection according to the key value which is transferred in when the function EVP_EncryptInit/EVP_DecryptInit( ) is invoked. Thereby, finding the key information according to the key value transferred in specifically includes searching in the key information collection by invoking functions, such as C_FindObjectsInit( ) C_FindObjects( ) and C_FindObjectFilal( ) of the PKCS#11 interface dynamic library, and the result of searching is key handle.

In CBC (chaining block cipher) mode, when the function EVP_EncryptInit/EVP_DecryptInit( ) is invoked, the parameter transferred in further comprises the initial vector value.

In addition, it should be noted that the information, such as the key length, the key block size, the initial vector length, the key value, and the key handle, is defined in the EVP_CIPHER data structure; the information above is called a key information, and the key information of different algorithm keys is made up of a key information collection.

Step 204, store the key handle of the second algorithm ID in the context structure of function init( ).

Specifically, the key handle of the second algorithm ID is stored in the context structure of encryption and decryption object in the engine.

Step 205, create key of the second algorithm ID and add the key information of the key in the key information collection.

Specifically, creating key includes creating a key template by invoking function C_CreateObject( ) of the PKCS#11 interface dynamic library. Thereby, creating the key template includes a key information, such as the key style, the key identifier, the key value, and the key handle, etc. The key identifier identifies that the key is an encryption key or a decryption key; the key handle is used by the encryption and decryption function.

Specifically, for example, when interface Encrypt_SSF33_CBC_Init( ) is invoked, the following operation is performed:

Step 2051: the key of the upper layer application is imported to the hardware encryption device by creating a key object via PKCS#11 interface C_CreateObject.

Furthermore, PKCS#11 interface C_GenerateKey can control the hardware encryption device to create the key.

Step 2052: by encryption initializing operation performed by PKCS#11 interface C_EncryptInit( ), the algorithm is set to be CKM_SSF33_CBC.

Thereby, CKM_SSF33_CBC refers to the SSF33 encryption and decryption operation.

Encrypt_Update and Encrypt_Final perform the following encryption operation via the PKCS#11 interface C_EncryptUpdate and PKCS#11 interface C_EncryptFinal, respectively.

Thereby, the decryption operation is similar with the encryption operation. No more further description is given here.

Thereby, the corresponding relation between the specific algorithm and the algorithm index is stored inside the engine.

OpenSSL invokes function EVP_EncryptUpdata/EVP_DecryptUpdata( ) after the invoking of init( ) is completed and before the function do_cipher( ) is invoked. By invoking the above interface function, the engine submits an algorithm list of the hardware encryption device to the upper layer application, which determines the encryption and decryption algorithm to be used by the hardware encryption device currently. The upper layer application can use the algorithm in the hardware encryption device, which is specifically completed by invoking the do_cipher( ) interface.

Firstly, it should be noted that, when the function do_cipher( ) is invoked, the parameters transferred include

```
int(*do_cipher)(EVP_CIPHER_CTX *ctx,//context
unsigned char *out,// encryption/decryption exported data
const unsigned char *in,// encryption/decryption imported data
unsigned int in1);// length of encryption/decryption imported data
```

Thereby, the definition of EVP_CIPHER_CTX data structure is

```
_struct evp_cipher_ctx_st
{
const EVP_CIPHER *cipher;// algorithm
ENGINE *engine; //engine
int encrypt; //encryption or decryption
int buf_len; // length of the data currently to be processed
unsigned char oiv[EVP_MAX_IV_LENGTH]; // initial original vector
unsigned char iv[EVP_MAX_IV_LENGTH]; // current initial variable
unsigned char buf[EVP_MAX_BLOCK_LENGTH];// saved data block part
int num; // used by CFB/OFB mode only
void *app_data; // other additional data
int key_len; //key length
unsigned long flags; // flag position
void *cipher_data; // parts related to respective algorithms, mainly refers to the key of
respective algorithms etc.
int final_used;
int block_mask;// block mask
unsigned char final[EVP_MAX_BLOCK_LENGTH];// final packet block
} /* EVP_CIPHER_CTX */;
    typedef struct evp_cipher_ctx_st EVP_CIPHER_CTX;
```

Thereby, cipher is selected by the upper layer application via the algorithm list of bind_engine( ) interface reported by the engine. The engine is created by the upper layer application and associated with the algorithm list when the bind_engine( ) is invoked. Other key data is determined by specific operation process.

Figure 7:
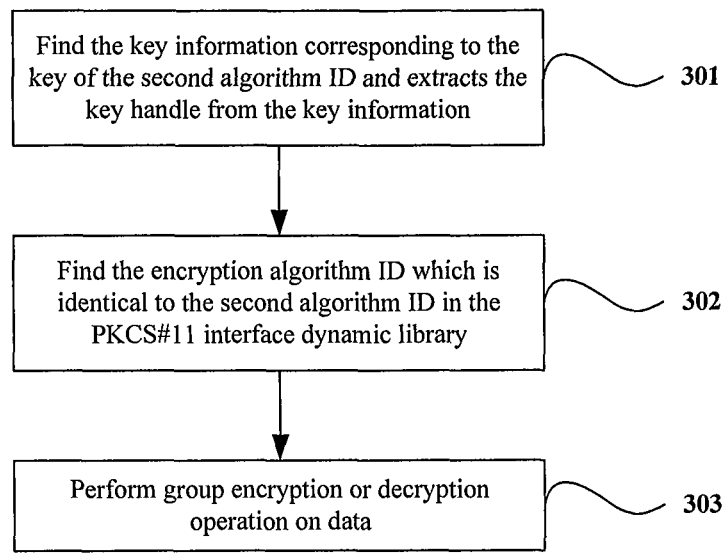
FIG. 7 is a flow chart for sub-package encryption and decryption.

Referring to FIG. 7, when the do_cipher( ) interface is invoked by the upper OpenSSL application, the hardware encryption engine performs the following operation:

Step 301, find the key information corresponding to the key of the second algorithm ID from the key information collection according to the context structure EVP_CIPHER_CTX of the do_cipher and take out the key handle.

Step 302, find the encryption and decryption algorithm ID which is identical to the second algorithm ID in the PKCS#11 interface dynamic library.

Step 303, control the hardware encryption device to perform packet encryption or decryption operation on the data transferred in according to the found encryption and decryption algorithm and export a perform result.

After invoking the do_cipher( ) interface is completed, OpenSSL completes the using of the engine and releases the engine, which is implemented by clean_up( ) interface.

When the clean_up( ) interface is invoked by the upper layer OpenSSL application, the clean_up( ) is mainly for cleaning up the key corresponding to the second algorithm ID and the key information. The way of cleaning up is finding the corresponding key information from the key information collection according to the context structure transferred in the engine and clean up the key and the key information.

Specifically, when the clean_up( ) interface is invoked, the key and the key information in the hardware encryption device are destructed via the function C_DestroyObject of the PKCS#11 interface. In addition, after what is describe above, the hardware encryption engine can close the connection between the hardware encryption engine and the hardware encryption device via function C_CloseSession in the PKCS#11 interface.

It should be noted that ending the entire invoking of whole PKCS#11 interface can be implemented by PKCS#11 interface C_Finalize in the above process.

Embodiment 3

In the embodiment 3, a hardware encryption engine provides four interfaces, such as bind$_{13}$ engine( ), init( ), do_cipher( ), and clean_up( ). Thereby, the bind engine interface bind_engine( ) is for binding the engine; the key initializing interface init( ) is for obtaining encryption and decryption algorithm in a hardware encryption interface dynamic library and initialize key and key information; the data encryption and decryption interface do_cipher( ) is for performing block encryption or decryption operation; and the engine releasing interface clean_up( ) is for releasing engine.

In the embodiment 3, the hardware encryption engine builds connection with a hardware encryption device via a CSP (Cryptographic Service Provider) interface dynamic library, so as to complete encryption and decryption operation.

Connection with the hardware encryption device is built via CryptAcquireContext of CSP interface;

Algorithm list of the hardware encryption device is obtained by CryptGetProvParam of CSP interface;

Key is imported via CryptImportKey of CSP interface;

Key is generated via CryptGenerateKey of CSP interface;

Encryption is performed via CryptEncrypt of CSP interface;

Decryption is performed via CryptDecrypt of CSP interface;

Environment is cleaned up via CryptDestroyKey and CryptReleaseContext of CSP interface;

The key and key information in the hardware encryption device are deleted via CryptAcquireContext (DELETE_KEYSET) of CSP interface.

Figure 8:
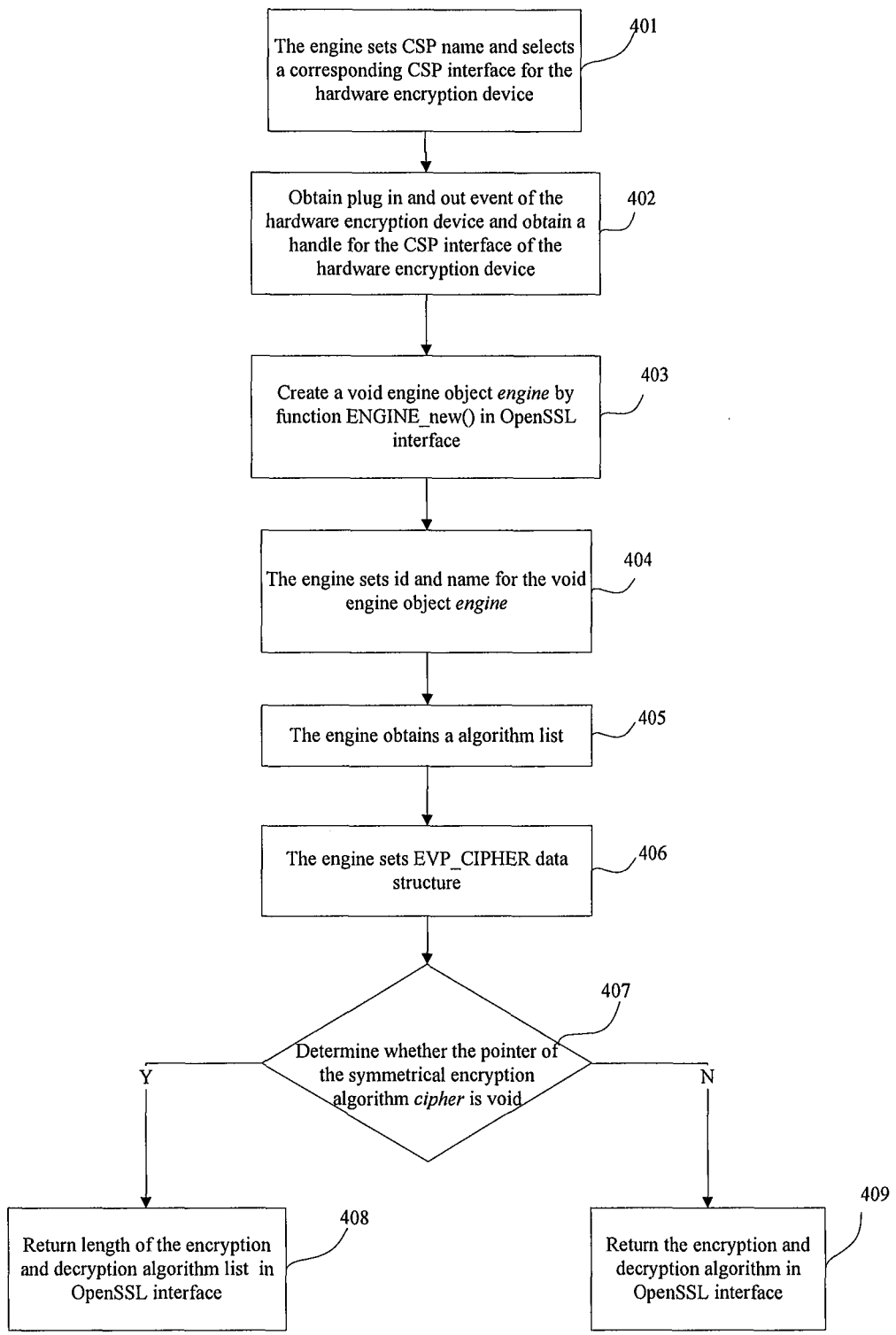
FIG. 8 is a another flow chart for binding an engine.

The detail of the progress is as the following:

FIG. 8 is a flow chart for binding an engine. FIG. 8 shows a process of binding the CSP interface dynamic library with the OpenSSL interface. When the bind_engine( ) interface is invoked by the upper layer OpenSSL interface, the hardware encryption engine (briefly as "engine" hereafter) performs the following operation:

Step 401, the engine sets up the name of CSP and selects the corresponding CSP interface for the hardware encryption device.

Thereby, the hardware encryption device can be a mart key device (such as USB Key) at client side and an encryption equipment at server side, etc.

Step 4011, define a command CSP_SET in the engine; the command is for assigning the name of CSP.

Thereby, a CMD command function for assigning CSP name is ENGINE_CTRL_FUNC_PTR and the definition for the CMD command function is as the following:

typedef int (*ENGINE_CTRL_FUNC_PTR)(ENGINE*, int, long, void*, void (*f)(void));

When the engine performs the above CMD command function, the engine transfers CSP name in the engine and stores the CSP name in a global variable as well; and thus the engine can use the global variable when the CSP name is needed (such as invoking CryptAcquireContext function).

Step 4012, the engine registers the above command to the engine by invoking function ENGINE_set_ctrl_function( ).

In fact, the principle for the engine to set up the CSP name is the same as ENGINE_set_id and ENGINE_set_name. In this way, when the engine is used by the external, CSP name can be set up by invoking function ENGINE_ctrl_cmd_string (e, "CSP_SET", "XXXXXX", 0).

It should be noted that, when the hardware encryption engine is realized by using the CSP interface, different hardware encryption devices will have different CSP interfaces which are distinguished by the engine according to CSP names, that is, the CSP name and the CSP interface are corresponding to each other.

Step 402, the engine obtains plug-in &out event of the hardware encryption device to get a handle for the CSP interface of the hardware encryption device and builds connection with the hardware encryption device.

The engine obtains the plug in and out event of the hardware encryption device by getting WM_DEVICECHANGE type event via invoking a system function WindowProc. Thereby, DBT_DEVICEARRIVAL message is a plug-in event and DBT_DEVICEREMOVECOMPLETE message is a remove-out event.

It should be noted that, because WM_DEVICECHANGE type is for obtaining all of events of the USB devices (Broadly speaking, USB device refers to a device with USB interface and the hardware encryption device can be the hardware encryption device which uses USB interface or does not use the USB interface. But what the system function WM_DEVICECHANGE is reflected is all of the USB interface devices), invoking function WM_DEVICECHANGE may receive non-hardware encryption device event. Therefore, invoking CryptAcquireContext (handle of CSP interface) is needed to determine whether the received plug in and out event is the plug in and out event of the hardware encryption device, which is determined by whether the CryptAcquireContext is invoked successfully. If the hardware encryption device is in plug-out status, the handle of the CSP interface is not obtained.

In addition, it should be noted that if a new hardware encryption device is plugged in, the context structure of the hardware encryption device can be obtained (e.g. the CSP interface handle of the hardware encryption device can be obtained) as the CryptAquireContext is invoked.

Thereby, the function CryptAcquireContext is an existed defined function in the CSP interface library.

In addition, it should be noted that the computer system will allocate a handle to the engine automatically according to CSP name set by the engine; in this way, the engine obtains CSP interface handle, so as to perform operation on the hardware encryption device.

Step 403, the engine creates a void engine object engine via function ENGINE_new( ) of the OpenSSL interface.

Step 404, the engine sets up an id and a name for the void engine object engine, such as ENGINE_set_id(engine, "rt18651b"), ENGINE_set_name(engine, "BSD rt18651b engine").

Step 405, the engine obtains the algorithm list of the hardware encryption device.

Specifically, the engine obtains the algorithm list of the hardware encryption device via CryptGetProvParam of the CSP interface;

Step 406, the engine sets up EVP_CIPHER data structure for the upper layer OpenSSL application to invoke.

Detail has been illustrated specifically in Step 110 and no more further detail is given here.

Step 407, determining whether cipher, the pointer of the encryption and decryption algorithm transferred in from bind_engine( ) interface, is null, if yes, go to Step 408, otherwise go to Step 409.

Specifically, according to the encryption and decryption algorithm of the hardware encryption device transferred from bind_engine( ) interface, EVP_CIPHER obtains the encryption and decryption algorithm of the hardware encryption device which becomes the encryption and decryption algorithm of the engine;

Step 408, the engine assigns the encryption and decryption list value of the OpenSSL interface to cipher, the pointer of the encryption and decryption algorithm of the engine, and returns encryption and decryption algorithm list length of the OpenSSL interface back.

Thereby, the encryption and decryption algorithm list length refers to the number of the encryption and decryption algorithms.

When the pointer of the encryption and decryption algorithm of the engine is null, since the encryption and decryption algorithm of the engine stores the encryption and decryption algorithm of the hardware encryption device, that the pointer of the encryption and decryption algorithm of the engine is void shows that no encryption and decryption algorithm is in the hardware encryption device. At that time, the encryption and decryption algorithm list value of the OpenSSL interface is assigned to the pointer of the encryption and decryption algorithm of the engine. When the encryption and decryption algorithm of the engine is invoked, the engine invokes the encryption and decryption algorithm of the OpenSSL interface according to the pointer with assigned value.

Step 409, find the encryption and decryption algorithm of OpenSSL interface corresponding to the encryption and decryption algorithm of the hardware encryption device according to the mapping relation between the encryption and decryption algorithm of the hardware encryption device and the encryption and decryption algorithm in OpenSSL interface and algorithm ID, and return the encryption and decryption algorithm in OpenSSL interface.

When the pointer of the encryption and decryption algorithm of the engine is not void, it shows that the hardware encryption device contains encryption and decryption algorithm. At that time, find the encryption and decryption algorithm in the OpenSSL interface corresponding to the encryption and decryption algorithm of the hardware encryption device according to the mapping relation between the encryption and decryption algorithm of the hardware encryption device and the encryption and decryption algorithm in the OpenSSL interface and the algorithm ID and return the encryption and decryption algorithm in the OpenSSL interface. That is, store the encryption and decryption algorithm in the OpenSSL interface in the symmetrical encryption object of the engine. In this way, what the symmetrical object of the engine is stored is the encryption and decryption algorithm in the OpenSSL interface which has the mapping relation with the encryption and decryption algorithm of the hardware encryption device.

FIG. 9 is a flow chart for obtaining encryption and decryption algorithm of CSP interface dynamic library. In FIG. 9, when the init( ) interface is invoked by the upper OpenSSL application, the hardware encryption engine performs the following operation:

Step 501, obtain algorithm ID of the encryption and decryption algorithm of OpenSSL interface corresponding to the encryption and decryption algorithm of the hardware encryption device from the context structure of the init( ) interface, and record the algorithm ID as the first algorithm ID.

Specifically, obtain the first algorithm ID by the ctx->cipher->nid variable of the context structure.

Thereby, the ctx->cipher->nid variable of the context structure is provided by the obtained cipher object in the engine.

Step 502, according to the mapping relation between the encryption and decryption algorithm of the hardware encryption device and the algorithm of the encryption and decryption algorithm of the OpenSSL interface, obtain the encryption and decryption algorithm ID of the hardware encryption device corresponding to the first algorithm ID from the CSP interface dynamic library and record the encryption and decryption algorithm as the second algorithm ID; store the second algorithm ID in the engine, such that the engine set the encryption and decryption algorithm currently used by the hardware encryption device to be the encryption and decryption algorithm corresponding to the second algorithm ID.

Specifically, the second algorithm ID is stored in the field cipher_data(ctx->cipher_data) in the context structure of the init( ) function.

Thereby, one-to-one correspondence mapping relation between the hardware encryption device and the algorithm in the OpenSSL which has identical parameters is built in the engine. Specifically, the identical parameters refer to identical key length, identical package length, and identical initial vector length, etc.

For the convenience of understanding of the embodiment 3, the embodiment 3 illustrates a detailed process of obtaining the second algorithm ID according to the mapping relation between the encryption and decryption algorithm of the hardware encryption device and the encryption and decryption algorithm in the OpenSSL interface. If the algorithm of the OpenSSL interface is IDEA (International Data Encryption Algorithm), the algorithm of the CSP interface dynamic library is SSF33. The mapping relation between the two algorithms has been defined in the engine object already. The parameters of the IDEA algorithm and the parameters of Triple Data Encryption Standard SSF33 are identical. IDEA algorithm ID is obtained via the ctx->cipher->nid variable of the context structure of the advanced encryption standard AES algorithm. If the AES algorithm ID is obtained, SSF33 algorithm is searched for according to the mapping relation and the ID of SSF33 algorithm which is the second algorithm ID is obtained.

Step 503, find the second algorithm ID in the key information collection and determine whether the second algorithm ID can be found, if yes, go to Step 504; otherwise, go to Step 505.

Specifically, determining whether the key information of the second algorithm ID can be found in the key information collection includes searching for the key information in the key information collection by invoking function EVP_EncryptInit/EVP_DecryptInit( ) in OPenSSL interface and the key value transferred in as the function EVP_EncryptInit/EVP_DecryptInit( ) is invoked. Thereby, finding the key information according to the key value transferred includes searching in the key information collection, and the searching result is a key handle.

When CBC (Complement Block Coding) encryption mode is used, the parameter list of function EVP_EncryptInit/EVP_DecryptIni( ) contains an initial vector value.

In addition, it should be noted that information, such as the key length, the key block length, the initial vector length, the key value, and the key handle, etc., is defined in the encryption and decryption algorithm object EVP_CIPHER structure. The information is called key information, and different key information is made up of key information collection.

Step 504, store the key handle of the second algorithm ID in the context structure of function init( ).

Specifically, the key handle is stored in the context structure of the encryption object of the engine.

Step 505, create the key of the second algorithm ID, and add the key information of the key to the key information collection.

Specifically, the key is created by invoking function CryptImportKey( ) of the CSP interface. Thereby, creating key template includes key information, such as a key value and a key handle, etc.

Referring to FIG. 10, when the do_cipher( ) interface is invoked by the upper layer OpenSSL application, the hardware encryption engine performs the following operation:

Step 601, finding the key information corresponding to the second algorithm ID in the key information collection according to the context structure of do_cipher( ) interface and taking out the key handle from the key information.

Step 602, finding the encryption and decryption algorithm ID, which is identical to the second algorithm ID, from the CSP interface dynamic database.

Step 603, control the hardware encryption device to perform a packet encryption or decryption operation on the data transferred in according to the found encryption and decryption algorithm.

where, the packet encryption and decryption operation includes Electronic Code Book (EBC) mode and cipher block chaining (CBC) mode.

When the encryption and decryption operation is completed, the cleap_up interface is invoked, so as to clear the environment.

When the clean_up( ) interface is invoked by the upper layer OpenSSL application, it is mainly for clearing the key of the second algorithm ID and the key information. The method of clearing includes finding the corresponding key information from the key information collection according to the context structure transferred in the engine and clearing the key and key information.

Specifically, when the function clean_up( ) is invoked, the key and key information in the hardware encryption device is destroyed by function C_DestroyObject of PKCS#11 interface; In addition, the hardware encryption engine then closes the connection between the hardware encryption engine and the hardware encryption device by the function C_CloseSession of the PKCS#11 interface;

It should be noted that PKCS#11interface C_Finalize can be used to end of invoking the entire PKCS#11 interface by the hardware encryption engine.

The hardware encryption engine provided by the invention adds and extends some hardware encryption and decryption algorithm to the software algorithm. Meanwhile, the implementing of the hardware encryption engine can support multiple thread and SSL communication. In order to make the engine to support multiple threads, a mutex lock and customized data structure are used to realize concurrency control. If the encryption and decryption algorithm supports SSL (Secure Socket Layer) communication protocol (SSL protocol defines that the key for encryption and the key for decryption are separated) as well, when the key is created, usage of the key should be identified.

In addition, it should be noted that, the encryption and decryption algorithm described above refers to a symmetrical encryption and decryption algorithm.

Embodiment 4

As an extension of the present software algorithm database, such as OpenSSL dynamic database, a hardware engine provides an interface used for increasing hardware algorithm for a user. The data structure provided by the hardware engine includes not only data but also all kinds of methods (the method herein refers to algorithm callback function collection), the method is alternative. Generally, the hardware engine provides a default method, and an increasing algorithm is realized by replacing the default method.

Data structure of the hardware engine will be introduced before the details of the embodiment 4. The data structure is as the following:

```
typedef struct engine_st
    {
    const char *id;
    const char *name;
    const RSA_METHOD *rsa_meth;
    const DSA_METHOD *dsa_meth;
    const DH_METHOD *dh_meth;
    const ECDH_METHOD *ecdh_meth;
    const ECDSA_METHOD *ecdsa_meth;
const RAND_METHOD *rand_meth;
        const STORE_METHOD *store_meth;
    int (*init)(void);
    int (*finish)(void);
int (*destroy)(void);
    EVP_PKEY *(*load_privkey)(const char *key_id, const char
    *passphrase);
    EVP_PKEY *(*load_pubkey)(const char *key_id, const char
    *passphrase);
        int ctrl_f(ENGINE *e, int cmd, long i, void *p, void (*f)(void));
const ENGINE_CMD_DEFN *cmd_defns;
ENGINE_SSL_CLIENT_CERT_PTR load_ssl_client_cert;
    int flags;
    /* reference count on the structure itself */
    int struct_ref;
    /* reference count on usability of the engine type. NB: This
    * controls the loading and initialization of any functionality
    * required by this engine, whereas the previous count is
    * simply to cope with (de)allocation of this structure. Hence,
    * running_ref <= struct_ref at all times. */
    int funct_ref;
```

```
        /* A place to store per-ENGINE data */
        CRYPTO_EX_DATA ex_data;
        /* Used to maintain the linked-list of engines. */
        struct engine_st *prev;
        struct engine_st *next;
    } ENGINE;
```

Specifically, the hardware engine provided by the invention adds the symmetrical algorithm of the key device to the present software algorithm database by implementing the id, the name field, the RSA_METHOD method, the init( ), the finish( ), the destroy( ), the ctrl-f( ), the load_privkey( ), and the load_pubkey( ) in the data structure described above;

It should be noted that the method in the data structure above can be replaced with the DSA_METH, DH_METHOD, ECDH_METHOD, ECDSA_METHOD, RAND_METHOD, or STORE_METHOD, in order to achieve the purpose of adding the algorithm of the key device to the OpenSSL dynamic database, which is not in the scope of the illustration of the invention. No more detail is given here.

Thereby, the hardware engine to be loaded is determined by setting the id and the name of the hardware engine. The init( ) is for initializing the PKCS#11 interface dynamic database to bond a specified function pointer and the function pointed by the function pointer is implemented by the function pointer in the engine data structure, for example, the algorithm function in the key device; the finish( ) is for clearing the resource occupied by the hardware engine; the destroy( ) is for clearing applied resource; the ctrl_f( ) is for implementing customizing command function; the load_privkey( ) is for loading private key; the load_pubkey( ) is for loading public key; the load_ssl_client_cert is for loading certificate; the flags field is for identifying whether the algorithm used by the hardware engine is the default algorithm provided by the hardware engine or a customized algorithm.

Thereby, the method RSA_METHOD is described as the following:

From what is described above, RSA_METHOD data structure defines initial/finish interface init/finish, RSA public key encryption/decryption interface rsa_pub_enc/rsa_pub_dec, RSA private key encryption/decryption interface rsa_priv_enc/rsa_priv_dec and RSA signature/signature verification interface rsa_mod_exp/bn_mod_exp; implementing RSA_METHOD is for implementing naturally the eight function interfaces described above.

It should be noted that the eight function interfaces described above can be implemented optically, that is, be implemented optically according to the function of the hardware engine; For example, for the hardware engine is used for an asymmetrical encryption/decryption, the RSA public key encryption/decryption interface and RSA private key encryption/decryption interface are required to be implemented and the identifier flags in the RSA_METHOD structure are set to be RSA_FLAG_EXT_PKEY for indicating data exchange; Furthermore, for example, the engine for signature/signature verification operation needs implementing RSA signature/signature verification interface and the identifier flags in the RSA_METHOD structure are set to be RSA_FLAG_SIGN_VER for indicating signature operation, etc.

Thereby, padding is a way of fill/un-fill which is set by the user; flags field is for identifying the kind of operation that RSA_METHOD data structure is used for, for example, if the flags is set to be RSA_FLAG_SIGN_VER, it indicates that the data structure is for signature/signature verification, the rsa_sign/rsa_verify in the data structure will be used; while the RSA_public_decrypt/RSA_private_encrypt will not be used. Thereby, the value of the flags can be RSA_FLAG_EXT_PKEY (for data exchange).

It should be noted that the initialization/finishing interface init/finish in the embodiment 4 is set to be null and is not be used, which is not in the scope of the illustration of the invention. The embodiment provides description for the else six function interfaces.

Embodiment 5

Based on what is described above, the hardware engine is for implementing engine binding interface bind_engine( )

```
    typedef struct rsa_meth_st
        {
        const char *name;
        int (*rsa_pub_enc)(int flen,unsigned char *from,unsigned char *to, RSA *rsa,int
padding);
        int (*rsa_pub_dec)(int flen,unsigned char *from,unsigned char *to, RSA *rsa,int
padding);
        int (*rsa_priv_enc)(int flen,unsigned char *from,unsigned char *to, RSA *rsa,int
padding);
        int (*rsa_priv_dec)(int flen,unsigned char *from,unsigned char *to, RSA *rsa,int
padding);
        int (*rsa_mod_exp)(BIGNUM *r0,BIGNUM *I,RSA *rsa); /* Can be null */
        int (*bn_mod_exp)(BIGNUM *r, BIGNUM *a, const BIGNUM *p, const BIGNUM
*m, BN_CTX *ctx, BN_MONT_CTX *m_ctx); /* Can be null */
        int (*init)(RSA *rsa);      /* called at new */
        int (*finish)(RSA *rsa); /* called at free */
        int flags;           /* RSA_METHOD_FLAG_* things */
        char *app_data;          /* may be needed! */
    /* New verify functions: some libraries don't allow arbitrary data to be signed/verified: this
allows them to be used. Note: for this to work the RSA_public_decrypt( ) and
RSA_private_encrypt( ) should *NOT* be used RSA_sign( ), RSA_verify( ) should be used
instead. Note: for backwards compatibility this functionality is only enabled if the
RSA_FLAG_SIGN_VER option is set in 'flags'. */
        int (*rsa_sign)(int type, unsigned char *m, unsigned int m_len, unsigned char *sigret,
unsigned int *siglen, RSA *rsa);
        int (*rsa_verify)(int dtype, unsigned char *m, unsigned int m_len, unsigned char
*sigbuf, unsigned int siglen, RSA *rsa);
        } RSA_METHOD;
``` and the engine initializing interface init( ), engine finishing interface finish( ), engine destroying interface destroy( ), customizing function interface ctrl_f( ), private key loading interface load_privkey( ), public key loading interface load_pubkey( ), certificate loading interface load_ssl_client_cert( ), and the interfaces such as RSA public key encryption/decryption interface rsa_pub_enc( )/rsa_pub_dec( ), RSA private key encryption/decryption interface rsa_priv_enc( )/rsa_priv_dec( ), and the RSA signature/signature verification interface rsa_mod_exp( )/bn_mod_exp( ) in the RSA_METHOD of the first data structure, to achieve the purpose of replacing the RSA algorithm in the OpenSSL dynamic database with the algorithm of the key device. Then, detailed description for respective interfaces is as the following.

In the embodiment 5, the hardware engine communicates with the key device which is connected to a host via PKCS#11 (password token) interface database, to achieve the purpose of replacing the RSA algorithm in the present software algorithm database with the RSA algorithm in the key device and complete the operations such as data encryption/decryption and identification authentication, etc. by using public/private key in the key device. The PKCS#11 interface dynamic database is provided by the developer of the key device. The detail inside the PKCS#11 interface dynamic database is not in the illustration scope of the invention.

Referring to FIG. 11, when the engine binding interface bind_engine( ) is invoked by the upper layer application, the hardware engine performs the following operation:

Step 1101, create an engine object e;

Specifically, the step is implemented by function ENGINE_new( );

Thereby, the function ENGINE_new( ) is defined in the OpenSSL dynamic database, and the engine object e created by the function is null.

Step 1102, set an id and a name for the created engine object e.

Specifically, the step is implemented by ENGINE_set_id( ) and ENGINE_set_name( );

For example, ENGINE_set_id(e, engine_rsaref_id); ENGINE_set_name(e, engine_rsaref_name); The upper layer application loads corresponding hardware engine according to the set id and the name of the engine when the upper layer application invokes the function.

Step 1103, set crtl_f( ) to control and invoke customizing command function;

Specifically, the crtl_f( ) is set by the function ENGINE_set_ctrl_f_function( );

Thereby, the description for crtl_f( ) is as the following:

```
int(*ctrl_f)(ENGINE *e,          /*engine*/
    int cmd,                     /*command number*/
    long i,                      /* length of input parameter */
        void *p,                 /* content of input parameter */
    void (*f)( ));
```

Specifically, examples of the customized commands are as the following:

| | | |
|---|---|---|
| (1). pkcs11lib | set PKCS#11 database name; | |
| (2). setxcert | set certificate needed; | |
| (3). usetokeni | select a slot Slot; | |
| (4). usetokenn | select a device by key device sequence number; | |
| (5). setpin | set PIN code of the selected Slot; | |
| (6). login | log in; | |
| (7). logout | log out; | |
| (8). getslots | obtain total number of hardware key devices. | |

In the embodiment 5, the customized commands implemented and controlled by ctrl_f( ) include all of the commands of the examples above;

Specifically, the customized commands described in the example above is implemented by setting the command number field in ctrl_f( ).

Step 1104: set load_privkey( );

Specifically, load_privkey( ) is set by the function ENGINE_set_load_privkey_function( ).

It should be noted that the loadprivkey( ) is set to be void.

Step 1105: set loadssl_f( ) to load the certificate and the public/private key pair;

Specifically, the callback function is set by the function ENGINEset_load_ssl_client_cert_function( ) in which the certificate and the private/public key pair are loaded; the upper layer application loads the certificate and the private/public key pair by revoking load_ssl_client_cert( );

Thereby, the description of the loadssl_f( ) is as the following:

```
int (*loadssl_f)(ENGINE *e,           /* engine */
SSL *ssl,                    /* SSL */
STACK_OF(X509_NAME) *ca_dn,  /* CA Issuer Name*/
X509 **pcert,                /* user certificate */
EVP_PKEY **pkey,             /* private/public key pair */
STACK_OF(X509) **pother,
UI_METHOD *ui_method,
void *callback_data);
```

Specifically, the operation of loading the client side certificate and the private/public key pair is performed by setting the callback function ENGINE_set_load_ssl_client_cert_function( ).

It should be noted that if a plurality of certificates are stored in a smart key device, correspondingly, a plurality of key pair are presented so that during loading the private function, all of the certificates and the keys in the smart key device are traversed and grouped according to the CKA_ID (an attribution of an object in the P11 interface) uniformly, so as to make the certificates and the keys correspond with each other. And then, selecting a certificate is implemented by setting certificate setting command in the crtl_f( ); and a selected certificate and its corresponding key are saved in the field **pcert.

Step 1106: set load_pubkey( ).

Specifically, the load_pubkey( ) is set by the function ENGINE_set_load_pubkey_function( ).

It should be noted that the set load_pubkey( ) is void.

Step 1107: set RSA_METHOD data structure;

Specifically, the RSA_METHOD data structure can be set by the function ENGINE_set_RSA( ).

Specifically, setting the RSA_METHOD data structure refers to setting a pointer of the RSA public key encryption/decryption interface rsa_pub_enc( )/rsa_pub_dec( ), RSA private key encryption/decryption interface rsa_priv_enc( )/rsa_priv_dec( ), RSA signature/signature verification interface rsa_mod_exp( )/bn_mod_exp( ), and SSL client side authenticating interface in the RSA_METHOD data structure. When the upper layer application invokes the pointer above, the application goes to the process flow of the RSA public key encryption/decryption interface rsa_priv_enc( )/rsa_priv_dec( ), RSA signature/signature verification interface rsa_mod_exp( )/bn_mod_exp( ), and SSL client side authenticating interface.

Figure 12:
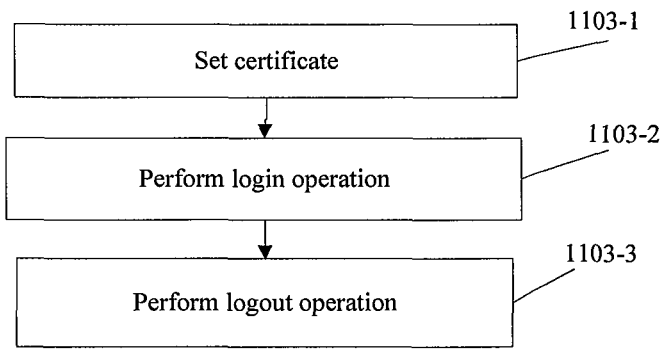
FIG. 12 is a flow chart for invoking the crtl_f( ) interface provided by the embodiment of the present invention.

It should be noted that, setting crtl_f( ) in step 103 refers to setting the function pointer of crtl_f( ). When the upper layer application invokes the pointer above, the application goes to the process flow of crtl_f( ) as the following:

Referring to FIG. 12, when the crtl_f( ) is invoked by the upper layer application, the hardware engine performs the following operation specifically:

1103-1, setting a certificate;

Specifically, setting enumCert command. When the command is invoked, a certificate list in the smart key device is returned back. A certificate and a key are selected from the certificate list by the command of selecting certificate setCert command and the selected certificate and key are stored in memory;

Specifically, the enumCert command is realized by invoking the C_FindObjectInit( ), C_FindObjects( ), and C_FindObjectsFinal( ) in the PKCS#11 dynamic library.

1103-2, performing logon operation;

Specifically, the step is realized by invoking the C_Login( ) and C_GetSessionInfo( ) in the PKCS#11 dynamic library.

Thereby, C_Login( ) is for logging on, C_GetSession Info( ) is for updating the logon status of the smart key device.

1103-3, performing logout operation;

Specifically, the step is realized by invoking the C_Logout and C_GetSessionInfo in the PKCS#11 dynamic library.

It should be noted that when crtl_f( ) is invoked, the following operation can be realized: setting the name of the PKCS#11 dynamic library, selecting a slot slot, selecting a device number by the smart key device, setting the PIN code of the selected slot; selecting the total number of the hardware encryption devices, etc; and the set name of the PKCS#11 dynamic library, the selected slot slot, the selected device number, the set PIN code of the selected slot slot and the obtained total number of the hardware encryption devices are stored in the cache and can be got from the cache directly for the subsequent use.

Figure 13:
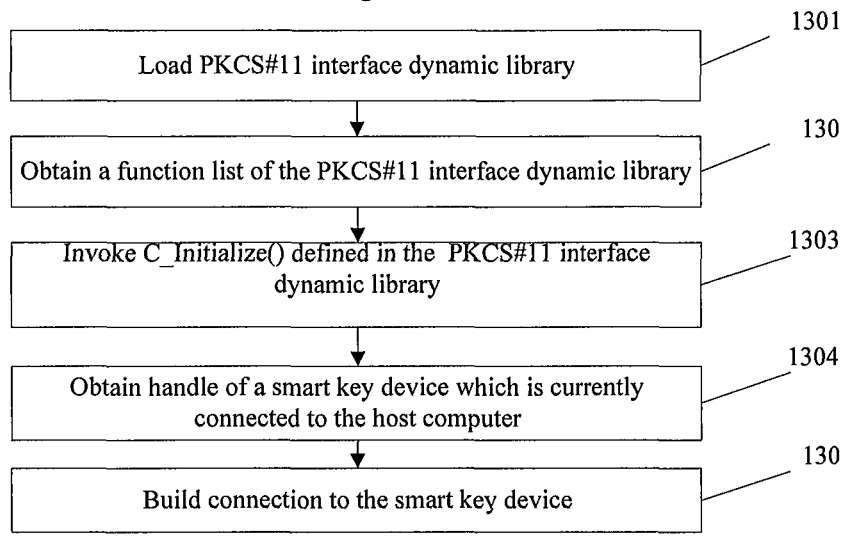
FIG. 13 is a flow chart for invoking the engine initializing interface init provided by the embodiment of the present invention.

Referring to FIG. 13, when the engine initializing interface init( ) is invoked by the upper layer application, the hardware engine performs the following operation:

Step 1301, load the PKCS#11 interface dynamic library;

Preferably, the step is completed by invoking the system function loadlibrary( ) of the computer.

Further, load the PKCS#11 interface dynamic library corresponding to the name of the PKCS#11 dynamic library which is controlled and realized in the crtl_f( ).

Step 1302, obtain the function list of the PKCS#11 interface dynamic library.

Preferably, the step is completed by invoking the function C_GetFunctionList( ) in the PKCS#11 interface;

Further, the step can be realized by invoking the computer system function GetProcAddress( ) to try to obtain the entry point of the C_GetFunctionList( ) at the PKCS#11 and obtain other entry of the PKCS#11 by the PKCS#11 function list obtained by the function C_GetFunctionList( ) after the function C_GetFunctionList( ) is invoked successfully.

Specifically, the function list of the PKCS#11 dynamic library can be CK_FUNCTION_LIST_PTR.

It should be noted that, the function list of the PKCS#11 dynamic library contains a pointer of the function pointer in the PKCS#11 dynamic library.

Step 1303, invoke the function C_Initialize( ) defined in the PKCS#11 dynamic library to initialize the PKCS#11 interface dynamic library.

It should be noted that the C_Initialize( ) should be invoked before other operations which are performed according to the PKCS#11( ) interface specification and standards.

Furthermore, in the process, the following operation is performed:

Step 1303', create and initiate monitoring thread and monitor the plug in and out event of the smart key device by the function C_WaitForSlotEvent( ) defined in the PKCS#11 interface dynamic library in such a way that the engine can respond correspondingly according to the Plug in and out event status of the smart key device in subsequent process.

Step 1304, obtain the handle of the smart key device which is connected to the computer currently;

Specifically, obtain the device list of the smart key devices which are connected to the computer by invoking the function C_GetSlotList( ) defined in the PKCS#11 interface dynamic library.

Specifically, if a plurality of the smart key devices are connected to the computer, preferably, select a smart key device in the device list which is corresponding to the sequence number of the smart key device controlled and realized in the crtl_f( ); correspondingly, select the first smart key device in the device list.

It should be noted that when a plurality of smart key devices are connected to the computer, the smart key device connected to the slot which is controlled and realized in the crtl_f( ) in the device list.

Step 1305, build connection with the smart key device;

Specifically, build connection with the smart key device by invoking the function C_OpenSession( ) defined in the PKCS#11 interface dynamic library.

Then, the information interaction between the hardware engine and the smart key device is realized by PKCS#11 interface.

Figure 14:
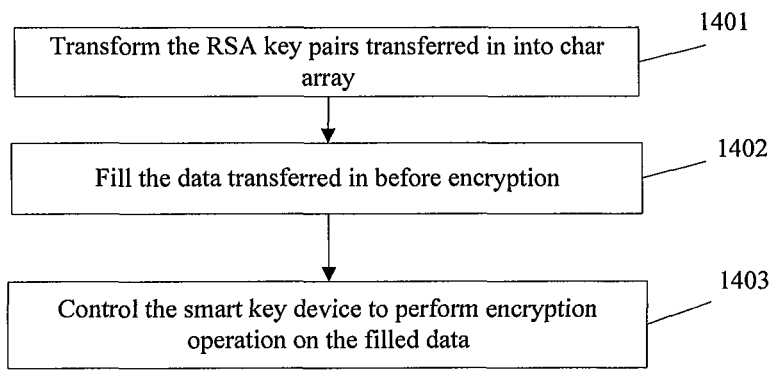
FIG. 14 is a flow chart for invoking the public key encryption interface rsa_pub_enc provided by the embodiment of the present invention.

Referring to FIG. 14, when the public encryption interface rsa_pub_enc( ) is invoked by the upper layer application, the hardware engine performs the following operation: In FIG. 14, the reference numbers 1402 and 1403 are both for the encryption and decryption.

Thereby, the description of the references of the public key encryption interface rsa_pub_enc( ) is as the following:

```
int(*rsa_pub_enc)(
int filen, /* length of data before encryption */
const unsigned char *from, /*data before encryption */
unsigned char *to, /*data after encryption */
RSA *rsa, /*RSA key pairs*/
int padding); /*RSA filling mode*/
```

Specifically, the RSA filling mode includes filing modes, such as RSA PKCS1, RSA X931, and RSA SSLV23, etc. or unfilled mode;

Step 1401, transform the RSA key pairs transferred in into char array form;

Specifically, when the public key encryption interface rsa_pub_enc( ) is invoked by the upper layer application, RAS key pairs will be transferred in by rsa field as well.

Specifically, the importing of the RSA key pairs is completed by invoking the C_CreateObject in the PKCS#11 interface.

Step 1402, fill the data transferred in which is not encrypted;

Specifically, along with the public key encryption interface rsa_pub_enc( ) is invoked by the upper layer application, the data which is not encrypted is transferred in by the field "from"; and RSA key pairs will be transferred in by field "padding";

Specifically, the encryption and decryption data is filled according to the filling mode for transferring in;

Specifically, a function of filling mode, such as RSA_padding_add_none, RSA_padding_PKCS1_type_1, RSA_padding_PKCS1_type_2, and RSA_padding_SSLv23, etc., is used to perform a filling operation on the data which is transferred in but is not yet encrypted;

Thereby, RSA_padding_PKCS1_type_1 is mainly for the filling of encryption with private key, while RSA_padding_PKCS1_type_2 is mainly for the filling of encryption with public key.

Step 1403, control the smart key device to encrypt the filled data and output the encryption result.

Specifically, encrypt the filled data by invoking the function C_EncryptInit and the function C_Encrypt in the PKCS#11 interface dynamic library and output the encryption result by the field "to" of the public key interface rsa_pub_dec( ).

It should be noted that when the public key decryption interface rsa_pub_dec( ) is invoked by the upper layer application, the decryption on the data is completed by invoking the C_DecryptInit and C_Decrypt in the PKCS#11 interface dynamic library, other operations are similar with the above operation and no more detail is given here.

Figure 15:
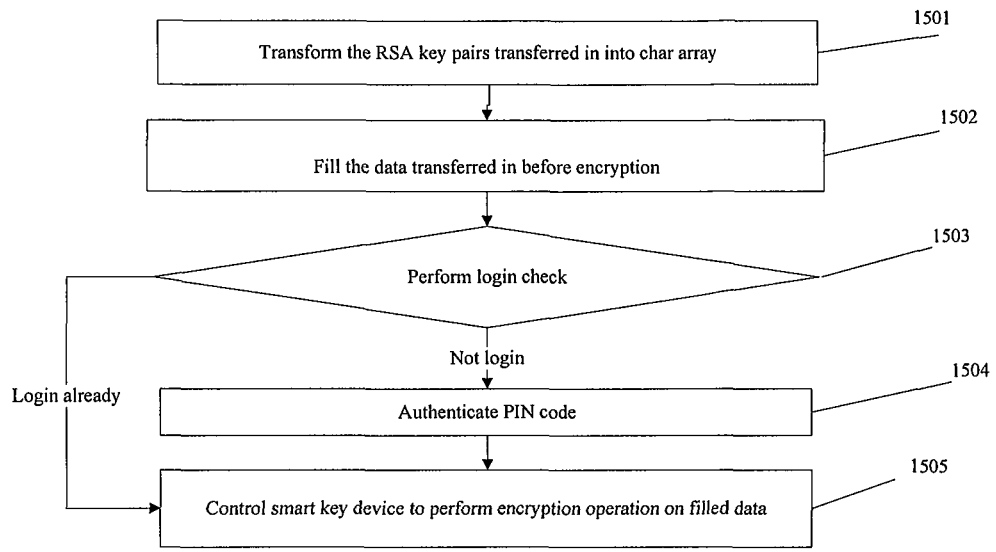
FIG. 15 is a flow chart for invoking the private key encryption interface rsa_piv_enc provided by the embodiment of the present invention.

Referring to FIG. 15, when the private encryption interface rsa_piv_enc( ) is invoked by the upper layer application, the hardware engine performs the following operation:

Thereby, the description of the parameters of the private key encryption interface rsa_piv_enc( ) is as the following:

```
int(*rsa_piv_enc)(
    int filen, /*length of data before encryption*/
    const unsigned char *from, /*data before encryption*/
    unsigned char *to, /*encrypted data*/
    RSA *rsa, /*RSA key pairs*/
    int padding); /*RSA filling mode*/
```

Specifically, the RSA filling mode includes filling mode such as RSA PKCS1, RSA X931, and RSA SSLV23, etc., or null filing mode;

Step 1501: transform RSA private key into char array;

Specifically, when the private encryption interface rsa_piv_enc( ) is invoked by the upper layer application, the RSA key pairs are transferred in by rsa field with invoking of the interface;

Step 1502, fill the data transferred in before encryption;

Specifically, when the public key encryption interface rsa_pub_enc( ) is invoked by the upper layer application, the data before encryption is transferred in by field from and the RSA filling mode is transferred in by field padding;

Specifically, the encrypted and decrypted data is filled according to the filling mode transferred in;

Specifically, the filling mode function such as RSA_padding_add_none, RSA_padding_PKCS1_type_1, RSA_padding_PKCS1_type_2 or RSA_padding_SSLv23, etc. performs filling operation on the data before encryption transferred in; thereby RSA_padding_PKCS1_type_1 is mainly for filling private key encryption, while RSA_padding_PKCS1_type_2 is mainly for filling public key encryption.

Step 1503: check login status, if the status is login, go to Step 1505; otherwise, go to Step 1504;

Step 1504: log in and authenticate PIN code; go to Step 1505 after successful authentication.

Specifically, the login operation is completed by invoking the function C_Login in the PKCS#11 interface dynamic library;

It should be noted the login operation can be performed when the smart key device is connected with the host computer;

Specifically, the maximum times for entering PIN code is limited in the step; if the accumulated times for entering PIN code by mistake beyonds a predetermined maximum times, the operation is ended.

Step 1505, control the smart key device to perform encryption operation on the filled data, and output the result of encryption; Figs. are all for the encrypted and decrypted data.

Specifically, encrypt the filled data by invoking the C_SignRecoverInit and C_SignRecover in the PKCS#11 interface dynamic library and output the encrypted data by field to of the public key encryption interface rsa_pub_enc( ).

It should be noted that when the private key decryption interface rsa_piv_dec( ) is invoked by the upper layer application, filled data is decrypted by invoking the C_VerifyRecoverInit and VerifyRecover in the PKCS#11 interface dynamic library. Other operations are similar to the operation described above and no more detail is given here.

Figure 16:
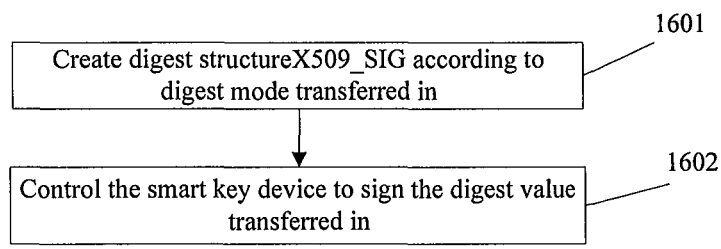
FIG. 16 is a flow chart for invoking the signature interface rsa_sign provided by the embodiment of the present invention.

Referring to FIG. 16, when signing interface rsa_sign( ) is invoked by the upper layer application, the hardware engine performs the following operation.

Thereby, the description of the interface rsa_sign( ) is as the following:

```
int (*rsa_sign) (
    int type, /* digest mode */
    const unsigned char *m, /* digest value */
    unsigned int m_length, /* length of digest value */
    unsigned char *sig, /* The parameter returns the result of signing*/
    unsigned int *siglen, /* length of signature value */
    const RSA *rsa); /* RSA key pairs */
```

Step 1601: create digest structure X509_SIG according to the digest mode transferred in;

It should be noted that when the interface rsa_sign( ) is invoked by the upper layer application, the digest mode is transferred in by the field type of the interface with the invoking of the interface;

Thereby, defined in crypto/x509/x509.h, the digest structure X509_SIG, which is for storing digest or signing value, is as following:

```
Typedef struct X509_sig_st
{
X509_ALGOR *algor;
ASN1_OCTET_STRING *digest;
}X509_SIG;
``` specifically, algor refers to digest algorithm, and digest is for storing digest or signing value. When signing data, a digest calculation is performed on the data at first and the calculation result is encoded according DER (Distinguished Encoding Rules) by X509_SIG structure, then a calculation is performed with private key and what is stored in the digest is the digest value at that time.

Step 1602, control the smart key device to sign the digest value transferred in;

It should be noted that, when the interface rsa_sign( ) is invoked by the upper layer application, the digest value is transferred in by the field m of the interface with the invoking of the interface;

Specifically, the smart key device performs signature calculation on the digest value transferred in according to the loaded algorithm key;

Specifically, realize the loading of algorithm key via function load_ssl_client_cert( ).

It should be noted that, if a specified algorithm key is in the smart key device, a signature calculation is performed by using the specified key of ID.

Specifically, the signing operation is completed by invoking the C_SignRecoverInit( ) and C_SignRecover( ) of the PKCS#11 interface.

It should be noted that the digest value of the smart key device transferred in includes the filled digest value, the hardware engine fills the digest value encoded according to DER in the X509_SIG structure, for example, the RSA key with 1024 bits must be filled with 128 bytes and the specific filling mode is specified by the user.

Figure 17:
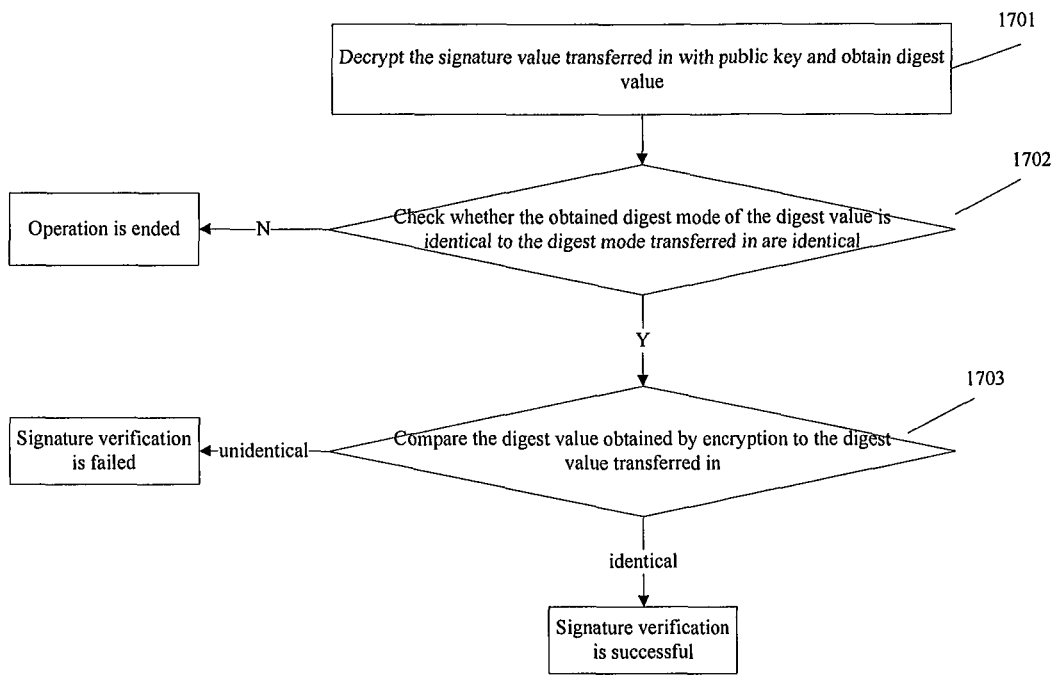
FIG. 17 is a flow chart for invoking the signature verification interface rsa_verify provided by the embodiment of the present invention.

Referring to FIG. 17, the signature verification interface rsa_verify( ) is invoked by the upper layer application, the hardware engine performs the following operation:

Thereby, the description of the interface rsa_verify( ) is as the following:

```
int (*rsa_ verify) (
    int type, /* digest mode */
    const unsigned char *m, /* digest value */
    unsigned int m_length, /* length of the digest value */
    unsigned char *sig, /* the parameter is signature value*/
    unsigned int *siglen, /* the length of the signature value */
    const RSA *rsa); /* RSA key pairs*/
```

Before the illustration of specific operation, it should be known that when the interface rsa_verify( ) is invoked by the upper layer application, the parameters transferred in with the invoking of the interface include the digest mode, the digest value, the length of digest value, the signature value, the length of the signature value, and the RSA key pairs, etc.

Step 1701: decrypt the signature value transferred in with public key to obtain digest value;

Specifically, decrypt the signature value transferred in by invoking the C_DecryptInit, C_Decrypt in the PKCS#11 in the dynamic library;

Step 1702: check whether the digest mode of the obtained digest value accords with the "digest mode" transferred in, if yes, go to Step 1703, if no, end the operation;

Step 1703, compare the encrypted digest value with the "digest value" transferred in, if they accord with each other, a signature verification is success, otherwise, the signature verification is failed.

Figure 18:
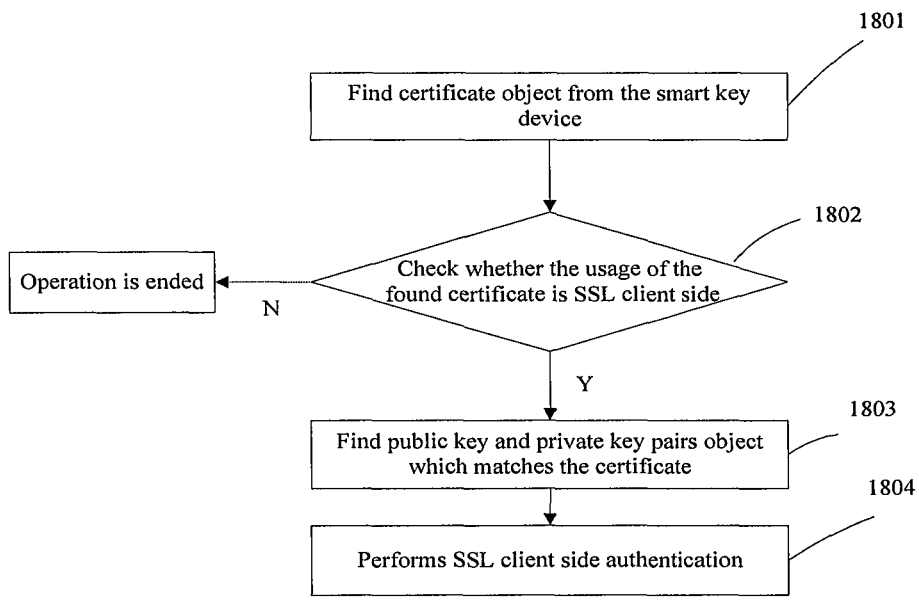
FIG. 18 is a flow chart for invoking the loading client certificate interface ENGINE_set_load_ssl_client_cert_function provided by the embodiment of the present invention.

Referring to FIG. 18, when the loaded certificate function interface ENGINE_set_load_ssl_client_cert_function( ) of the client side is invoked, the hardware engine performs the following operation:

Specifically, the loading of certificate of SSL client side and the operation of public/private key pairs are performed by function loadssl_f( );

The code is as the following:

```
int (*loadssl_f)(ENGINE *e, /* engine */
    SSL *ssl, /* SSL */
    STACK_OF(X509_NAME) *ca_dn, /* CA issuer name */
    X509 **pcert, /* user certificate */
    EVP_PKEY **pkey, /* public /private key pairs */
    STACK_OF(X509) **pother,
    UI_METHOD *ui_method,
    void *callback_data);
```

Specifically, the operation on the client side certificate and the public/private key pairs is performed by setting the callback function ENGINE_set_load_ssl_client_cert_function( );

Step 1801: find certificate object from the smart key device;

Step 1802: check whether the usage of the found certificate is SSL client side, if yes, go to Step 1803, otherwise, end the operation;

It should be noted that data structure X509_PURPOSE, which is used for checking the usage of the certificate and is defined in x509v3.h, is as the following:

```
typedef struct x509_purpose_st
{
int purpose;
int trust;
int flags;
int(*check_purpose)(conststruct x509_purpose_st*,const X509*,int);
char *name;
char *sname;
void *usr_data;
}X509_PURPOSE;
```

Purpose is the ID of the certificate usage, check_purpose is the function of checking the usage of the certificate;

Specifically, when checking the usage of the certificate, find the corresponding X509_PURPOSE and invoke the function check_purpose to determine whether the usage of the certificate is legal and check the usage of the certificate by the function X509_check_purpose (X509*x, int id, int ca), thereby, X is ID of the usage of the certificate to be checked, while ca indicates whether X is the ca certificate.

Step 1803: according to the found certificate used for SSL client side, search for the object of the public/private key pairs, which matches with the found certificate, in the smart key device, if the matched certificate cannot be found, report error;

Step 1804, perform SSL client side authentication.

It should be noted that the hardware engine performs SSL client side authentication only if the other side requests to authenticate the client side certificate.

After the operation above completed, the interface finish( ) will be invoked by the upper layer application, the using of the smart key device is ended; the interface destroy_f( ) is invoked by the upper layer application to release occupied resource;

In addition, after that, the connection between the hardware engine and the smart key device can further be closed by the function C_CloseSession in the PKCS#11 interface.

Similarly, the hardware engine can communicate with the smart key device by CSP interface. For example, build connection to the smart key device by CSP interface CryptAcquireContext;

obtain algorithm list of the smart key device by CSP interface CryptGetProvParam;

obtain hash value of signature data by CSP interface CryptCreateHash (HCRYPTHASH hHash);

perform signing operation by CSP interface CryptSignHash;

verify signature by CSP interface CryptVerifySignature;

encrypt data by CSP interface CryptEncrypt;

decrypt data by CSP interface CryptDecrypt;

In addition, the hardware engine loads key by CSP interface HCRYPTKEY hKey;

The hardware engine builds connection to the smart key device by CSP interface; the implementing of customized commands is slightly different from PKCS #11 interface; the commands are as the following:

(1). cspname set CSP name;
(2). setxcert set the required certificate;
(3). setflags set flag;
(4). enumcontainer enumerate container (enumerate container for signature, signature verification or key exchanging class container);
(5). Usecontainer select container;

(6). setpin set PIN code of the selected container;
(7). login log in;
(8). logout log out;
(9). getslots obtain total number of containers.

The above are customized commands which are as referenced example only. The function of every command needs to be realized by function and is controlled to be invoked by control callback function.

It should be noted that command of setting flag "setflags". The flag set by the command is the flag in the function CryptAcquireContext( ) and can be the following several values:
1) value description
2) CRYPT_VERIFYCONTEXT sets the flag and the application cannot access private key or public/private key pairs, such as application for hash or systematical encryption and decryption operation only.
3) CRYPT_NEWKEYSET sets the flag and creates a new container.
4) CRYPT_DELETEKEYSET sets the flag and deletes a specified key container;
5) CRYPT_SILENT sets the flag and CSP does not display window of any user.

It should be noted that the unit for CSP is container; therefore, a command of enumerating container requires to be provided so as for a user to select a container, thereby, the hardware engine loads key and certificate by the container.

It should be noted that, while the hardware engine loading private key and certificate via CSP interface, the hardware engine first selects a container by a customized command, takes a key handle out from the selected container, and performs encryption or decryption on data according the key handle;

In such a way, through the hardware encryption engine, some hardware encryption and decryption algorithms, especially some algorithms which are not disclosed and can only be realized by hardware, can be added and extended to the software algorithm database after the operation described above.

Embodiment 6

Before the detailed description, data structure EVP_MD should be known a bit. The structure EVP_MD is for storing information of information digest algorithms, and a digest engine completes a corresponding digest algorithm by realizing the structure EVP_MD. The description of the structure EVP_MD is as the following:

```
typedef struct env_md_st
{
int type;
int md_size;
int (*init)(EVP_MD_CTX *ctx);
int (*update)(EVP_MD_CTX *ctx, const void *data, unsigned long count);
int (*final)(EVP_MD_CTX *ctx, unsigned char *md);
int (*cleanup)(EVP_MD_CTX *ctx);
    int block_size;
int ctx_size;
} EVP_MD;
```

Specifically, the explanation for the parameters in the data structure is as the following:
type—NID identifier of information digest algorithm (ID number of an algorithm) for indicating the adapted information digest algorithm.
md_size—digest value length generated by the information digest algorithm (unit: byte); if SHA1 algorithm is sealed in the EVP_MD structure, the present field is SHA1_DIGEST_LENGTH and the value is 20;
init—point to an initializing function of the information digest algorithm; point to SM3_init if SM3 algorithm is sealed in the structure EVP_MD;
update—point to a function of calculating digest value; point to MD5_update if MD5 algorithm is sealed in EVP_MD structure;
final—point to a function, which completes processing of the last data block, to be invoked after calculating digest value; point to SHA256_final if SHA256 algorithm is sealed in the EVP_MD structure;
block_size—point to the group length (unit: byte) of the data block on which digest calculation is performed; if SHA1 algorithm is sealed in EVP_MD structure, the present field is SHA1_CBLOCK and the value is 64;
ctx_size—indicate the space size of the allocated CTX (context) which is needed for implementing the information digest algorithm, the present field refers to sizeof (EVP_MD*)+sizeof(SHA_CTX) if SHA algorithm is sealed in the EVP_MD structure;
cleanup—for operation of cleanup, clean up EVP_MD structure.

Specifically, the digest engine provided by the invention realizes the extension of the information digest algorithm in the existed software algorithm base by realizing the engine binding interface bind_engine( ) and interfaces such as the initializing interface init( ), the first digest interface updata( ), the second digest interface final( ), and the engine releasing interface cleanup( ) which are registered in the EVP_MD structure; wherein the bind_engine( ) is for binding engine, the init( ) is for initializing digest algorithm, the updata( ) is for performing digest operation on the information digest data transferred in, the final( ) is for ending digest operation and outputting digest value, the cleanup( ) is for cleaning up EVP_MD structure of the information digest algorithm.

In the embodiment 6, the digest engine communicates with the smart key device connected to a host computer by the PKCS#11 (public key cryptography standards password token) interface dynamic library to realize adding the information digest algorithm in the smart key device to a presented software algorithm library and invoking the information digest algorithm in the smart key device to perform digest operation on data. PKCS#11 interface dynamic library is provided by the developer of the smart key device and the inner details of the PKCS#11 interface dynamic library is not in the scope described in the invention.

Figure 19:
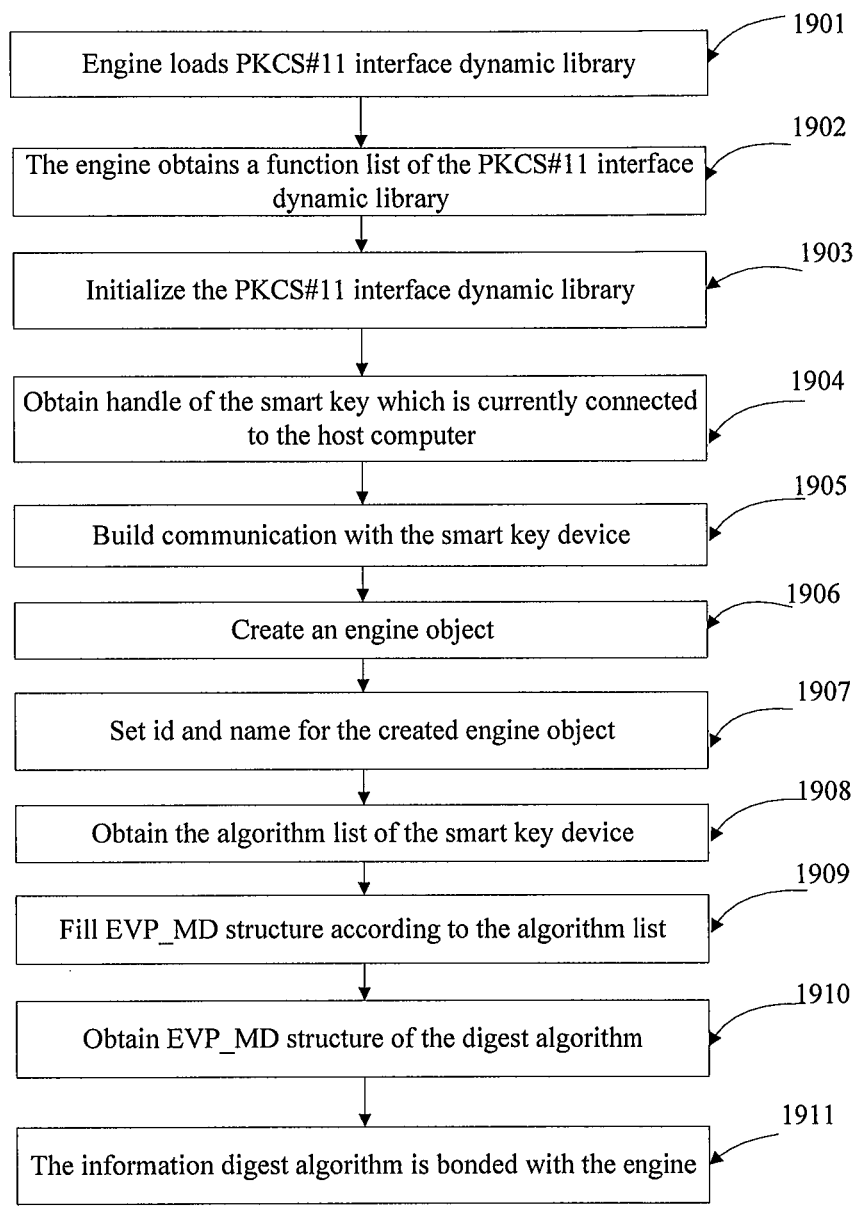
FIG. 19 is a flow chart for invoking the engine binding interface by an upper layer application provided by the embodiment of the present invention.

Referring to FIG. 19, when the engine binding interface bind_engine( ) is invoked by the upper layer application, the digest engine performs the following operation:

Step 1901, the engine loads PKCS#11 interface dynamic library;

Preferably, the step is completed by invoking the system function loadlibrary( ) of the computer.

Thereby, the file name of the PKCS#11 interface dynamic library is predetermined.

Step 1902, the engine obtains the function list in the PKCS#11 interface dynamic library;

Preferably, the step is completed by invoking the function C_GetFunctionList( ) in the PKCS#11 interface.

Furthermore, the step can be implemented by invoking the computer system function GetProcAddress( ) to try to obtain the entry point of the function C_GetFunctionList( ) at PKCS#11 interface; obtaining other entry points of the PKCS#11 after successful invoking the function C_GetFunctionList( ) and invoking those interfaces to obtain the function list of the PKCS#11 interface dynamic library; if the trying is failed, report error and the process returns back.

Specifically, the function list of the PKCS#11 interface dynamic library can be CK_FUNCTION_LIST_PTR.

It should be noted that the obtained function list contains the pointer of the function pointer in the PKCS#11 interface dynamic library. In this way, in the later operation of the engine, invoking the function in the PKCS#11 interface library can be realized by invoking the pointer of the function pointer, for example, the engine invokes the C_Initialize( ) in the PKCS#11 interface dynamic library and can be realized by invoking the pointer of the obtained C_Initialize( ) pointer, etc.

Step 1903, the engine invokes C_Initialize( ) and initializes PKCS#11 interface dynamic library;

It should be noted that the C_Initialize( ) interface should be invoked at first before other operation according to the specification and standard of PKCS#11 interface.

Furthermore, the process further comprises the following operation:

The engine creates and initiates a monitoring thread for monitoring plug in and out event of the smart key device, so as to respond in time in subsequent process;

Preferably, monitoring the plug in and out event of the smart key device (plug in and out of the smart key device) is realized by invoking the function C_WaitForSlotEvent( ) defined in the PKCS#11 interface dynamic library.

It should be noted that monitoring the plug in and out status of the smart key device is for informing the engine of the current status of the smart key device in time, if the smart key device is removed out, the engine closes session with the smart key device in time; if the smart key device is plugged in, the engine initiates the session with the smart key device in time, so as to improve the working efficiency. At the same time, any mistake can be avoided for the smart key device is in plug out status while the engine initiates a session temporarily when using the smart key device.

Step 1904, the engine obtains the handle of the smart key device currently connected to the host computer;

Specifically, the engine obtains list of smart key device by invoking the function C_GetSlotList( ) defined in the PKCS#11 interface dynamic library;

In the embodiment 6, if a plurality of smart key devices are connected to the host computer at present, the first smart key device in the list is selected.

Step 1905, the engine builds up communication with the smart key device;

Preferably, that the engine builds up connection with the smart key device is realized by invoking the function C_OpenSession( ) defined in the PKCS#11 interface dynamic library.

Step 1906, the engine creates an engine object, for example, engine;

Specifically, the engine realizes the step by invoking ENGINE_new( ).

It should be noted that the engine object created by the ENGINE_new( ) is void.

Step 1907, the engine sets an id and a name for the created engine object;

Specifically, setting the engine id and name is realized by registering functions like ENGINE_set_id(e, engine_cipher_id) and ENGINE_set_name(e, engine_cipher_name), for example, ENGINE_set_id(engine, "rt18651b") and ENGINE_set_name(engine, "BSD rt18651b engine"). When the upper layer application invokes ENGINE_set_id (e,engine_cipher_id) and ENGINE_set_name (e, engine_cipher_name), a corresponding engine is selected.

Step 1908, obtain algorithm list of the smart key device;

Specifically, obtaining algorithm list by invoking C_GetMechanismList defined in the PKCS#11 dynamic library.

Thereby, algorithm list contains information digest algorithm attributions such as group length and digest value length, etc.

For example, the obtained algorithm list is {CKM_SHA_1, {0, 0, CKF_DIGEST}}.

Step 1909, fill the EVP_MD structure according to the obtained algorithm list for the upper layer application to invoke;

The specific filling is setting a corresponding algorithm ID number for any digest algorithm in the obtained algorithm list according to the definition of the upper layer application; setting digest value length md_size and group length block_size according to the value in the algorithm list and indicating the space of the allocated context needed by realizing the digest algorithm and setting the pointer of the interfaces such as the init( ), the updata( ), the final( ), and the cleanup( ).

Step 1910, obtain EVP_MD structure of the digest algorithm;

Specifically, the step is realized by invoking ENGINE_set_digests;

It should be noted that the digest algorithm supported by the current engine is set by invoking ENGINE_set_digests, and the EVP_MD structure of the digest algorithm is obtained, so as to obtain the operation interfaces and digest algorithm attributions, such as the init operation interface, the updata operation interface, the final operation interface, the cleanup operation interface, the group length of the information digest algorithm, the digest length, and the space size of the context, etc., sealed in the EVP_MD structure.

It should be noted that the default digest algorithms supported by the engine include MD5 and sha1.

Step 1911, realize the binding between the information digest algorithm and the engine;

Specifically, the step is realized by invoking NGINE_register_digests. ENGINE_set_digests adds the information digest algorithm supported by the current engine to the algorithm list of the upper layer application and builds association with the engine. In this way, the EVP_MD structure and the corresponding attribution of the information digest algorithm are obtained when the upper layer application uses the information digest algorithm.

It should be noted that when the init( ) interface, updata( ) interface, and final( ) interface are invoked by the upper layer application, the parameters transferred in generally include information of the information digest algorithm stored in the context and the EVP_MD structure, which includes the group length of the information digest algorithm, the digest value length, and the information digest algorithm ID, etc.

Figure 20:
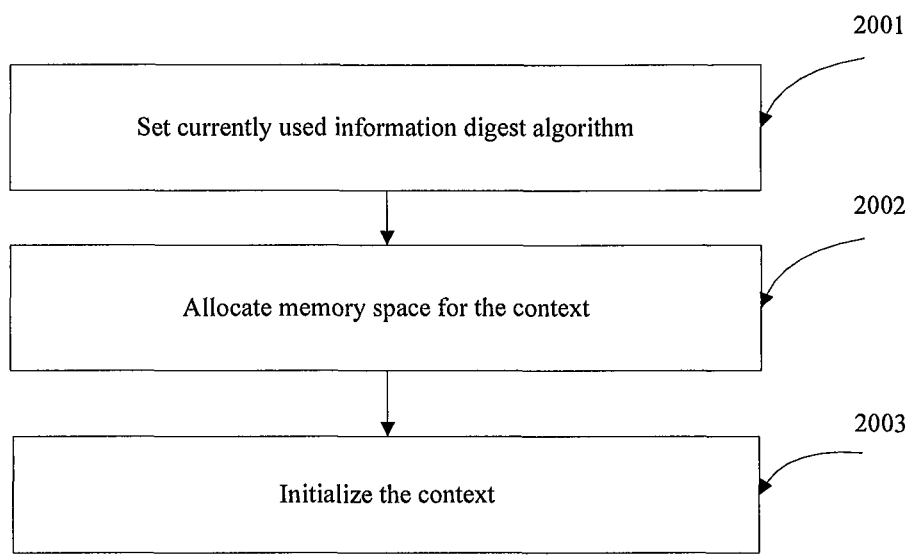
FIG. 20 is a flow chart for invoking the initializing interface by the upper layer application provided by the embodiment of the present invention.

Referring to FIG. 20, when the init( ) interface is invoked by the upper layer application, the digest engine performs the following operation:

Thereby, the description of the parameters of the init( ) is as the following:

int (*init)(EVP_MD_CTX*ctx//context);

Specifically, a brief introduction for the EVP_MD_CTX is as the following:

```
typedef struct env_md_ctx_st
{
const EVP_MD *digest;
ENGINE *engine;
unsigned long flags;
void *md_data;
}EVP_MD_CTX;
```

Specifically, the introduction of the references in the EVP_MD_CTX is as the following:

digest—point to the pointer of the EVP_MD structure;

engine—the pointer points to the engine if the algorithm is provided by the engine;

md_data—information digest data;

Specifically, the engine is created by the upper layer application and builds association with the algorithm list when invoking the bind_engine( ), and the information digest data is determined by specific computation process.

Step 2001, set the information digest algorithm which is used currently;

Specifically, search for the corresponding information digest algorithm according to the information digest algorithm ID transferred in; if the corresponding information digest algorithm cannot be found, set the currently used information digest algorithm to be the default information digest algorithm, while if the corresponding information digest algorithm can be found, set the currently used information digest algorithm to be the information digest algorithm corresponding to the type of the information digest algorithm transferred in;

Specifically, the information digest algorithm ID is transferred in with the EVP_MD_CTX. When the digest in the EVP_MD_CTX structure is executed, the EVP_MD structure is pointed to, and the information digest algorithm ID in the structure is transferred in the init( ) interface.

Step 2002, allocate memory space for the EVP_MD_CTX (context);

Specifically, the memory space is allocated according to the size of the context space which is set when the bind_engine( ) interface is invoked.

For example, a two-way linked list is built for storing information digest data.

Step 2003, initialize context;

Specifically, assign initial value to the context, which is decided by the specific calculating process.

When the updata( ) interface is invoked by the upper layer application, the parameters transferred in include

```
int (*update)(EVP_MD_CTX *ctx, //context
const void *data, // information digest data
unsigned long count // Iterative times of calculation
```

When the updata( ) interface is invoked by the digest layer application, the digest engine caches the information digest data transferred in, controls the smart key device to perform digest calculation on the information digest data transferred in according to the information digest algorithm set currently and caches calculation result;

It should be noted that, when the updata( ) interface is invoked, more than one times of digest calculation is performed in the interface, and the times is determined by the specific operation process.

Specifically, the digest calculation is performed by invoking the C_DigestUpdate function of the PKCS#11 interface.

When the final( ) interface is invoked by the upper layer application, the parameters transferred in include:

```
int (*final)(EVP_MD_CTX *ctx,//context
unsigned char *md // abstract output data)
```

When final( ) interface is invoked by the upper layer application, the digest engine controls the smart key device to finish digest calculation and output the calculation result, specifically output the result by and field;

Specifically, the digest calculation is finished by invoking the function C_DigestFinal of PKCS#11 interface.

After the ending of invoking the final( ) interface, the cleanup( ) interface is invoked for clear up environment;

When the cleanup( ) interface is invoked by the upper layer application, the communication with the smart key device is closed by the PKCS#11 interface C_CloseSession;

Clear up the application source occupied by the digest engine, to end the using of the abstract engine.

Similarly, the digest engine can communicate with the smart key device by CSP (Cryptographic Service Provider) interface. For example, build connection with the smart key device by the CryptAcquireContext of the CSP interface;

obtain the algorithm list of the smart key device by the CryptGetProvParam of the CSP interface;

set the currently algorithm used by the smart key device by the cryptGreateHash of the CSP interface;

perform digest calculation on the data transferred in by the CrypthashData of CSP interface;

output the result of the digest calculation by the CryptGetHashParam of the CSP interface;

clear up the environment by the CryptReleaseContext of the CSP interface;

The specific process is similar to the process of communicating by the PKCS#11, and no further detail is given here.

In this way, after the above operation realized by the digest engine, some hardware digest algorithms, especially some undisclosed algorithms which can only be realized by hardware, can be added into the software algorithm library, and the software algorithm library is extended.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

The invention claimed is:

1. A method for implementing an encrypting engine by a smart key device, in which an upper layer application is implemented by invoking an engine binding interface, an initializing interface, a first interface, or an engine releasing interface, in which the first interface comprises a data encrypting and decrypting interface; or the first interface comprises an encrypting and decrypting interface, a signature interface, a signature verification interface, and a SSL client side authentication interface in a second data structure; or the first interface comprises a first digest interface and a second digest interface;

wherein said method comprises creating an engine object;

setting an id and a name for the created engine object;

setting function of crtl_f( ) to control and invoke customizing command comprising setting PKCS#11 database name, setting certificate needed, selecting a slot, selecting a device by key device sequence number, setting PIN code of the selected Slot, login, logout and obtaining total number of hardware key devices;

invoking the engine binding interface by the upper layer application;

building a connection to the smart key device by the engine;

controlling the smart key device to perform an encryption/decryption operation or a digest calculation on data transferred to the smart key device according to the currently set encryption and decryption algorithm and the algorithm key or information digest algorithm;

outputting an operation result;

wherein if the first interface comprises the data encrypting and decrypting interface, the initializing interface is a key initializing interface, and the method comprises that when the engine binding interface is invoked by the upper layer application, the engine builds a connection to the smart key device, gets an algorithm list of the smart key device, and fills a first data structure;

when the key initializing interface is invoked by the upper layer application, the engine sets up an encrypting and decrypting algorithm currently to be used by the smart key device according to the first data structure transferred in, and searches for a corresponding algorithm key, and controls the smart key device to create the corresponding algorithm key if the corresponding algorithm key fails to be searched out;

when the data encrypting and decrypting interface is invoked by the upper layer application, the engine controls the smart key device to perform an encryption/decryption operation on data transferred to the smart key device according to the currently set encryption and decryption algorithm and the algorithm key, and output an operation result; and when the engine releasing interface is invoked by the upper layer application, the engine ends the connection to the smart key device, or wherein if the first interface comprises an encryption and decryption interface, a signature interface, a signature verification interface, and a SSL client side authentication interface in a second data structure, the initializing interface is an engine initializing interface, and the method comprises that when the engine binding interface is invoked by the upper layer application, the engine builds a connection to the smart key device;

when the engine binding interface is invoked by the upper layer application, the engine is bonded, an algorithm key and a certificate are loaded, and the second data structure is set up; the algorithm key comprises a public key and a private key;

when the encrypting and decrypting interface in the second data structure is invoked by the upper layer application, the engine controls the smart key device to perform an encrypting/decrypting operation on data transferred to the smart key device according to the loaded algorithm key, and output an operation result;

when the signature interface in the second data structure is invoked by the upper layer application, the engine controls the smart key device to perform a signature operation on a digest value transferred in according to the loaded algorithm key, and return a signature result;

when the signature verification interface in the second data structure is invoked by the upper layer application, the engine controls the smart key device to perform a decryption operation on a signature value transferred in according to the loaded algorithm key, and verify whether the signature decryption result got by the decryption operation is correct, if yes, the signature verification is successful, while if no, the signature verification is failed;

when the SSL client side authentication interface in the second data structure is invoked by the upper layer application, the engine controls the smart key device to perform SSL client side authentication according to the loaded certificate, and return an authentication result; and when the engine releasing interface is invoked by the upper layer application, the engine ends the connection to the smart key device, or wherein if the first interface comprises the first digest interface and the second digest interface, the method comprises that when the engine binding interface is invoked by the upper layer application, the engine builds a connection to the smart key device, gets an algorithm list of the smart key device, fills a third data structure, and registers the third data structure to the upper layer application;

when the initializing interface is invoked by the upper layer application, the engine sets up an information digest algorithm used currently by the smart key device according to the third data structure transferred in, allocates storage space for a context transferred in, and initializes the context;

when the first digest interface is invoked by the upper layer application, the engine controls the smart key device to perform a digest calculation on information digest data transferred in according to the currently set information digest algorithm;

when the second digest interface is invoked by the upper layer application, the engine controls the smart key device to end digest calculation and output operation result; and when the engine releasing interface is invoked by the upper layer application, the engine ends the connection with the smart key device.

2. The method of claim 1, wherein when the first interface comprises the data encrypting and decrypting interface, the engine binding interface, the key initializing interface, the data encrypting and decrypting interface and the engine releasing interface are specifically bind_engine interface, init interface, do_cipher interface, and clean_up interface, respectively;

when the first interface comprises the encrypting and decrypting interface, the signature interface, the signature verification interface, and the SSL client side authentication interface in the second data structure, the engine binding interface, the engine initializing interface, and the engine releasing interface are specifically bind_engine interface, init interface, and destroy interface, respectively; and when the first interface comprises the first digest interface and the second digest interface, the engine binding interface, the initializing interface, the first digest interface, the second digest interface, and the engine releasing interface are specifically bind_engine interface, init interface, update interface, final interface, and cleanup interface.

3. The method of claim 2, wherein the encrypting engine builds the connection and communication with the smart key device via a hardware encrypting interface.

4. The method of claim 3, wherein when the first interface comprises the data encrypting and decrypting interface, filling the first data structure specifically comprises that the encrypting engine fills the first data structure transferred in according to the obtained algorithm list and the pointers of the init interface, the do_cipher interface and the clean_up interface; or when the first interface comprises the first digest interface and the second digest interface, filling the third data structure specifically comprises filling the third data structure according to the pointers of the initializing interface, a data digest interface, an digest output interface, and the engine releasing interface and the obtained algorithm list.

5. The method of claim 4, wherein when the first interface comprises the data encrypting and decrypting interface, filling the first data structure transferred in according to the obtained algorithm list and the pointers of the init interface, the do_cipher interface and the clean_up interface specifically comprises
- in the first data structure, setting a corresponding algorithm ID number for any encryption and decryption algorithm of the algorithm list according to an existed definition in the upper layer application;
- in the first data structure, setting corresponding values for key length, key grouping length, and initial vector length according to an value in the algorithm list, and setting corresponding function pointers for the init interface, the do_cipher interface, and the clean_up interface; and
- when the first interface comprises the first digest interface and the second digest interface, filling the third data structure according to the pointers of the initializing interface, the data digest interface, the digest output interface, and the engine releasing interface and the obtained algorithm list comprises
- according to the existed definition in the upper layer application, setting a corresponding algorithm ID number for the information digest algorithm of the algorithm list in the third data structure;
- according to the value in the algorithm list, setting corresponding values for the grouping length of the information digest algorithm and the digest value length in the third data structure, and setting the corresponding value for the context size needed by the information digest algorithm, and setting the corresponding interface pointers for the initializing interface, the first digest interface, the second digest interface, and the engine releasing interface.

6. The method of claim 1, wherein when the first interface comprises the data encrypting and decrypting interface, the engine sets the encryption and decryption algorithm currently to be used by the smart key device according to the first data structure transferred in, and searches for a corresponding algorithm key, and if the algorithm key cannot be searched out, controlling the smart key device to create the algorithm key specifically comprises that
- when the initializing interface is invoked by the upper layer application, the filled first data structure is transferred in the encrypting engine;
- the engine obtains a first encryption and decryption algorithm ID according to the algorithm pointer in the first data structure transferred in, and the encryption and decryption algorithm corresponding to the first encryption and decryption algorithm ID is the algorithm of the upper layer application;
- the smart key device obtains a second encryption and decryption algorithm ID corresponding to the first encryption and decryption algorithm ID according to a preset mapping relation, and the encryption and decryption algorithm corresponding to the second encryption and decryption algorithm ID is the algorithm in the smart key device;
- the engine searches for the second encryption and decryption algorithm ID in the key information collection of the smart key device, if the second encryption and decryption algorithm ID can be found, the engine stores the key handle corresponding to the second encryption and decryption algorithm ID in the context of the first data structure; while if the second encryption and decryption algorithm ID cannot be found, the engine controls the smart key device to create the second encryption and decryption algorithm key, and add the key information of the second encryption and decryption algorithm key to the key information collection;
- the second encryption and decryption algorithm is the encryption and decryption algorithm currently used by the smart key device.

7. The method of claim 6, wherein
the algorithm pointer is selected from the algorithm list of the first data structure by the upper layer application.

8. The method of claim 1, wherein when the first interface comprises the first digest interface and the second digest interface, that the engine sets the information digest algorithm currently used by the smart key device according to the third data structure transferred in specifically comprises that
- when the initializing interface is invoked by the upper layer application, the filled third data structure is transferred in the engine; and
- the engine searches for the corresponding information digest algorithm according to the information digest algorithm ID in the third data structure transferred in, if the corresponding information digest algorithm cannot be found, the currently used information digest algorithm is set to be default information digest algorithm, while if the corresponding information digest algorithm can be found, the current information digest algorithm is set to be information digest algorithm corresponding to the information digest algorithm ID transferred in.

9. The method of claim 6, wherein the preset mapping relation is created by the upper layer application, which builds a one-to-one corresponding mapping relation between the encryption and decryption algorithm in the smart key device and the encryption and decryption algorithm in the upper layer application which have the same algorithm parameters as each other;
thereby, the algorithm parameters specifically refer to the key length, the key grouping length, and the initial vector length.

10. The method of claim 1, wherein that the engine controls the smart key device to perform encryption and decryption operation on data transferred to the smart key device according to the currently set encryption and decryption algorithm and algorithm key, and output the operation result specifically comprises that
- when the data encryption and decryption interface is invoked by the upper layer application, the engine searches for and obtains the key handle of the encryption and decryption algorithm currently used by smart key device from context transferred to the smart key device; and
- the engine controls the smart key device to perform encryption and decryption operation on data transferred to the smart key device according to the found key handle, and output the operation result.

11. The method of claim 1, wherein when the first interface comprises the encryption and decryption interface, the signature interface, the signature verification interface, and the SSL client side authentication interface in the second data structure, binding the encrypting engine specifically comprises creating an engine object;

setting an engine id and an engine name for the created engine object; and binding the engine which is corresponding to the engine id and the engine name when the upper layer application invokes the set engine id and the engine name.

12. The method of claim 1, wherein when the first interface comprises the encryption and decryption interface, the signature interface, the signature verification interface, and the SSL client side authentication interface, loading the certificate and the algorithm key specifically is completed by load_ssl_client_cert( ).

13. The method of claim 12, wherein when a plurality of certificates are existed in the smart key device, the method further comprises loading certificates and private key by a loadssl_f( ) interface and a ctrl_f( ) interface, which specifically comprises that when the loadssl_f( ) interface is invoked by the upper layer application, traversing all of the certificates and the keys in the smart key device, and grouping them to make the certificates and the keys to be corresponding to each other; implementing command of setting the certificate in the ctrl_f( ) interface, the command of setting the certificate selects a certificate in the smart key device, and stores the selected certificate and the key corresponding to the selected certificate in the context of the engine; and loading the selected certificate and the corresponding algorithm key by load_ssl_client_cert( ).

14. The method of claim 3, wherein the hardware encryption interface comprises a password token interface;

when the hardware encryption interface is the password token interface, the operation implemented by a ctrl_f( ) interface further comprises selecting a slot, selecting the smart key device by the smart key device sequence number, and obtaining the total number of the smart key devices.

15. The method of claim 14, wherein the encrypting engine builds connection and communication with the smart key device via an encryption service providing program interface comprising enumerating containers, selecting a container, and obtaining the total number of the containers and the engine loads the algorithm key and the certificate by the container.

16. The method of claim 1, wherein when the first interface comprises the encryption and decryption interface, the signature interface, the signature verification interface, and the SSL client authentication interface in the second data structure, that the engine controls the smart key device to perform encryption and decryption operation on data transferred to the smart key device specifically comprises filling data transferred to the smart key device according to a preset mode of filling which is RSA PKCS1, RSA X931, RSA SSLV23, or unfilled mode;

performing login checking; if no login is performed, authenticating PIN code and performing login, while if the logon has been performed already, controlling the smart key device to perform the encryption and decryption operation on the filled data.

17. The method of claim 1, wherein, when the first interface comprises the encryption and decryption interface, the signature interface, the signature verification interface, and the SSL client side authentication interface, and when the signature interface in the second data structure is invoked by the upper layer application, the method further comprises creating a X509_SIG digest structure.

18. The method of claim 17, wherein when the first interface comprises the encryption and decryption interface, the signature interface, the signature verification interface, and the SSL client side authentication interface, the X509_SIG digest structure is used for storing a digest value and a signature value.

19. The method of claim 1, wherein when the first interface comprises the encryption and decryption interface, the signature interface, the signature verification interface, and the SSL client side authentication interface, that decrypting the signature value transferred in, and verifying whether the signature decryption result is correct specifically comprises decrypting the signature value transferred in by public key, and checking whether digest mode of the signature decryption result is identical to digest mode transferred in, if yes, comparing the signature decryption result with the digest value transferred in, and if they are identical, the signature verification being successful.

\* \* \* \* \*